US010005919B2

(12) United States Patent
Burdzy et al.

(10) Patent No.: US 10,005,919 B2
(45) Date of Patent: Jun. 26, 2018

(54) CURABLE ELASTOMER COMPOSITIONS WITH LOW TEMPERATURE SEALING CAPABILITY

(71) Applicant: Henkel IP & Holding GmbH, Duesseldorf (DE)

(72) Inventors: Matthew P. Burdzy, South Windsor, CT (US); Dingsong Feng, Melrose, MA (US); Kevin J. Welch, Wallingford, CT (US); Yanbing Wang, S. Glastonbury, CT (US); Robert P. Cross, Rocky Hill, CT (US)

(73) Assignee: Henkel IP & Holding GmbH, Duesseldorf (DE)

(*) Notice: Subject to any disclaimer, the term of this patent is extended or adjusted under 35 U.S.C. 154(b) by 0 days. days.

(21) Appl. No.: 14/682,251

(22) Filed: Apr. 9, 2015

(65) Prior Publication Data

US 2015/0210882 A1 Jul. 30, 2015

Related U.S. Application Data

(63) Continuation of application No. 13/796,588, filed as application No. PCT/US2012/035094 on Apr. 26, 2012, now abandoned.
(Continued)

(51) Int. Cl.
*C09D 123/22* (2006.01)
*F16J 15/14* (2006.01)
(Continued)

(52) U.S. Cl.
CPC ........ *C09D 133/08* (2013.01); *B32B 37/1284* (2013.01); *C09D 123/22* (2013.01);
(Continued)

(58) Field of Classification Search
CPC .............. C09K 3/1006; C09K 3/10; C09K 2003/1068; C09K 2200/0617;
(Continued)

(56) References Cited

U.S. PATENT DOCUMENTS 4,416,921 A 11/1983 Dunn
5,171,760 A 12/1992 Kaszas et al.
(Continued)

FOREIGN PATENT DOCUMENTS

EP 0353471 A2 2/1990
EP 0874027 A2 10/1998
(Continued)

OTHER PUBLICATIONS

EP 2042529 A1 (2009), machine translation, Google Patents.*
(Continued)

*Primary Examiner* — Josephine L Chang
(74) *Attorney, Agent, or Firm* — James E. Piotrowski

(57) ABSTRACT

Curable sealant compositions having low temperature sealing ability improved over convention curable sealing compositions. The composition is flowable and can be cured to a cross linked form to provide cured reaction products that exhibit elastomeric properties. The curable elastomeric sealant composition can include a cross linkable elastomeric oligomer; an initiator or cross-linking agent; a glassy monomer and/or a rubbery monomer; and optionally one or more additives. Cured reaction products of the composition have a single Tg and retain a higher sealing force at low temperatures (but above the cured product Tg) as compared to a curable composition made from the same cross linkable elastomeric oligomer but without the glassy and/or rubbery monomer.

15 Claims, 4 Drawing Sheets

Related U.S. Application Data

(60) Provisional application No. 61/479,710, filed on Apr. 27, 2011.

(51) Int. Cl.

| | | |
|---|---|---|
| *C09D 133/08* | (2006.01) | |
| *C09J 4/06* | (2006.01) | |
| *C09J 123/22* | (2006.01) | |
| *C09J 4/00* | (2006.01) | |
| *C09K 3/10* | (2006.01) | |
| *B32B 37/12* | (2006.01) | |

(52) U.S. Cl.
CPC . *C09J 4/00* (2013.01); *C09J 4/06* (2013.01); *C09J 123/22* (2013.01); *C09K 3/10* (2013.01); *C09K 3/1006* (2013.01); *F16J 15/14* (2013.01); *C09K 2003/1068* (2013.01); *C09K 2200/0617* (2013.01); *C09K 2200/0625* (2013.01); *Y10T 428/1352* (2015.01)

(58) Field of Classification Search
CPC ......... C09K 2200/0625; B32B 37/1284; C09J 4/06; C09J 123/22; C09J 4/00; C09D 123/22; C09D 133/08; F16J 15/14; Y10T 428/1352
USPC ......... 524/543; 156/327; 428/35.7; 277/316, 277/650; 522/64
See application file for complete search history.

(56) References Cited

U.S. PATENT DOCUMENTS

| | | |
|---|---|---|
| 6,582,824 B1 | 6/2003 | Weigl et al. |
| 8,066,288 B2 | 11/2011 | Burdzy et al. |
| 2002/0028303 A1 | 3/2002 | Bahadur et al. |
| 2003/0113519 A1 | 6/2003 | Wasserman et al. |
| 2006/0264573 A1 | 11/2006 | Bennett et al. |
| 2009/0162715 A1 | 6/2009 | Burdzy |
| 2010/0155247 A1 | 6/2010 | Cao et al. |
| 2011/0068512 A1 | 3/2011 | DeCato et al. |
| 2014/0193652 A1 | 7/2014 | Lionberger et al. |

FOREIGN PATENT DOCUMENTS

| | | | | |
|---|---|---|---|---|
| EP | 1266912 A1 | * | 12/2002 | ................ C08F 8/00 |
| EP | 1897896 A1 | | 3/2008 | |
| EP | 2042529 A1 | * | 4/2009 | ............ C08F 279/02 |
| EP | 1313820 | | 12/2009 | |
| JP | 64-085209 A | | 3/1989 | |
| JP | H0288614 A | | 3/1990 | |
| JP | H05246457 A | | 9/1993 | |
| JP | 2000178535 A | | 6/2000 | |
| JP | 2002526632 A | | 8/2002 | |
| JP | 2005060465 A | | 3/2005 | |
| JP | 2005154528 A | | 6/2005 | |
| JP | 2006008819 A | | 1/2006 | |
| JP | 2006282911 A | | 10/2006 | |
| JP | 2007039587 A | | 2/2007 | |
| JP | 2008546886 A | | 12/2008 | |
| JP | 2009043296 A | | 2/2009 | |
| JP | 2009524196 A | | 6/2009 | |
| JP | 2009531516 A | | 9/2009 | |
| JP | 2009246065 A | | 10/2009 | |
| JP | 2009280680 A | | 12/2009 | |
| JP | 2011527722 A | | 11/2011 | |
| JP | 2012102243 A | | 5/2012 | |
| WO | 2007111607 | | 10/2007 | |
| WO | 2010006093 A2 | | 1/2010 | |

OTHER PUBLICATIONS

International Search Report issued in connection with International Patent Application No. PCT/US2012/035094 dated Nov. 23, 2012.
Liao et al., Polymer Bulletin, vol. 6. Issue 3-4, pp. 135-141 (1981).
Puskas et al., Polymer Bulletin, vol. 20, Issue 3. 253-260 (1988).
"CAS Registry Number: 42592-17-2," SciFinder datasheet [retrieved March 4, 2014].
BASF Technical Data CAS 3290-92-4.

* cited by examiner

CURABLE ELASTOMER COMPOSITIONS WITH LOW TEMPERATURE SEALING CAPABILITY

FIELD

The present disclosure relates generally to curable sealant compositions having low temperature sealing ability improved over convention curable sealing compositions.

BRIEF DESCRIPTION OF RELATED TECHNOLOGY

Sealants are used in a broad range of applications from automobiles to aircraft engines to contain or prevent solids, liquids, and/or gases from moving across a mating surface, boundary or interfacial region into or on a surrounding or adjacent area, region or surface. Sealants are available in many forms from low viscosity liquids to highly thixotropic pastes and depending on the application can vary in properties from a rigid glassy material to a rubbery elastic network. Elastomers are an important class of polymeric materials useful as sealing compositions and the focus of the current invention.

Sealants formulated with monomers, oligomers, polymers and/or other ingredients that react to form new covalent bonds that increase the molecular weight of the chemical backbone leading to entanglements and/or chemical cross-links that exhibits elastic properties are generally referred to as "curing" compositions. Sealants containing ingredients that do not react but exhibit elastic properties based on the thermodynamic properties of the polymer, entanglement of network chains or other molecular interactions are generally referred to as "non-curing" formulations.

Definitions used in the literature to describe rubbery and elastomer materials are very similar and sometimes used interchangeably. Elastomer is more general and typically refers to the elastic-bearing properties of a material. Rubber was originally referred to as an elastomer derived from naturally occurring polyisoprene and has expanded over the years to include both natural and synthetic based materials. *IUPAC Compendium of Chemical Terminology*, 2nd ed. (the "Gold Book"); compiled by A. D. McNaught and A. Wilkinson. Blackwell Scientific Publications, Oxford (1997) defines an elastomer as a polymer that displays rubber-like elasticity. Elastomers are defined in the *Physical Polymer Science Handbook* by L. H. Sperling John Wiley & Sons, Inc., Publications, New York (2001) as an amorphous, cross-linked polymer above its glass transition temperature (Tg).

The equation of state for rubber elasticity describes the relationship between macroscopic sample deformation of a polymer (chain extension) and the retractive stress of the elastomer. The theory of rubber elasticity, derived from the second law of thermodynamics, states that the retractive stress of an elastomer arises as a result of the reduction in entropy upon extension and not changes in enthalpy. As a polymer chain is extended the number of conformations decrease (entropy decreases) and the retractive stress increases. Sperling writes that a long-chain molecule, capable of reasonably free rotation about its backbone, joined together in a continuous network is required for rubber elasticity.

$$\sigma = nRT \frac{r_i^2}{r_o^2}\left(\alpha - \frac{1}{\alpha^2}\right)$$ Equation of State for Rubber Elasticity Where $\sigma$ is the stress, n is the number of active network chains per unit volume, R is the ideal gas constant, T is temperature, $\alpha$ is the chain extension, and $r_i^2/r_o^2$ is the front factor that is approximately equal to one. The equation of state predicts that as the extension of an elastomer increases the observed stress increases. The stress is the retractive force created when for example an elastomer is placed under tension, biaxial tension or compression.

The theory of rubber elasticity can be observed in practice when a cured seal operating at a temperature above its glass transition temperature is compressed and exhibits sealing forces that can be measured using instruments know in the art. The glass transition temperature of the elastomer in the cured seal defines an important boundary condition where free rotation of the main chain is restricted as the elastomer transitions from the rubbery to the glassy region resulting in a loss of molecular free rotation, molecular chain extension and the resulting retractive stress. As the temperature of the elastomer approaches the glass transition temperature, the resulting elastic retractive force approaches zero.

The utility of an elastomeric sealant is measured by the ability of the cured sealant composition to provide a positive sealing force when exposed to operating conditions over the lifetime of the product. Temperature is an important factor that affects the performance of a sealant and can have a significant impact on the operating lifetime. The temperature range in harsh ambient conditions can vary from +150° C. to −65° C. In less severe applications temperatures can vary from +100° C. to −40° C.

It was observed that some cured elastomeric sealants at temperatures well above the glass transition temperature of the overall polymer network have a sealing force that decreases to nearly zero. In one case a cured, elastomeric sealant with a −61° C. Tg, measured by DSC, had a very low sealing force at −40° C. that would be unacceptable for most sealing applications.

It is known from statistical thermodynamics of rubber elasticity that the force generated during the deformation of an elastomer is directly proportional to the end-to-end distance of the cross-linked network and the temperature of the matrix. When an elastomer is deformed the retractive force should remain positive, in the rubbery region, as long as the temperature is above the Tg. There is nothing in the above equation of state of rubbery elasticity that would predict that changing the glassy or hard segment in an elastomer having a single Tg, and which exhibits no other first or second order thermodynamic transitions, could increase the low temperature sealing force within the rubbery region.

SUMMARY

One aspect of the disclosure provides a curable elastomeric sealant composition. The composition is flowable and can be cured to a cross linked form to provide cured reaction products that exhibit elastomeric properties. The curable elastomeric sealant composition can include a cross linkable elastomeric oligomer; an initiator or cross-linking agent; a glassy monomer and/or a rubbery monomer; and optionally one or more of a catalyst; a filler; an antioxidant; and an optional reaction modifier. The cross linkable elastomeric sealant composition can be prepared by reacting a cross linkable elastomeric oligomer having a Tg with at least one of a glassy monomer and a rubbery monomer. Cured reaction products of the composition have a single Tg and retain a higher sealing force at low temperatures (but above the cured product Tg) as compared to a curable composition made from the same cross linkable elastomeric oligomer but without the glassy and/or rubbery monomer.

In one embodiment the cross linkable elastomeric oligomer is a telechelic polyisobutylene (PIB) based material terminated at each end with acrylate moieties.

Another aspect provides a component having a first predetermined sealing surface aligned with a second predetermined sealing surface. A cured reaction product of a polyisobutylene (PIB) based composition is disposed between the sealing surfaces to prevent movement of materials such as liquids, gasses or fuels between the aligned sealing surfaces. The composition may be cured in contact with one, both or none of the sealing surfaces. Advantageously, the seal formed by the cured reaction product provides low temperature sealing (about −40° C.) within the rubbery region along with excellent resistance to moisture, water, glycols, acids, bases and polar compounds.

The disclosed compounds include any and all isomers and stereoisomers. In general, unless otherwise explicitly stated the disclosed materials and processes may be alternately formulated to comprise, consist of, or consist essentially of, any appropriate components, moieties or steps herein disclosed. The disclosed materials and processes may additionally, or alternatively, be formulated so as to be devoid, or substantially free, of any components, materials, ingredients, adjuvants, moieties, species and steps used in the prior art compositions or that are otherwise not necessary to the achievement of the function and/or objective of the present disclosure.

When the word "about" is used herein it is meant that the amount or condition it modifies can vary some beyond the stated amount so long as the function and/or objective of the disclosure are realized. The skilled artisan understands that there is seldom time to fully explore the extent of any area and expects that the disclosed result might extend, at least somewhat, beyond one or more of the disclosed limits. Later, having the benefit of this disclosure and understanding the concept and embodiments disclosed herein, a person of ordinary skill can, without inventive effort, explore beyond the disclosed limits and, when embodiments are found to be without any unexpected characteristics, those embodiments are within the meaning of the term about as used herein.

BRIEF DESCRIPTION OF THE DRAWINGS

Referring now to the drawings wherein like elements are numbered alike in the several Figures.

DETAILED DESCRIPTION

Figure 1:
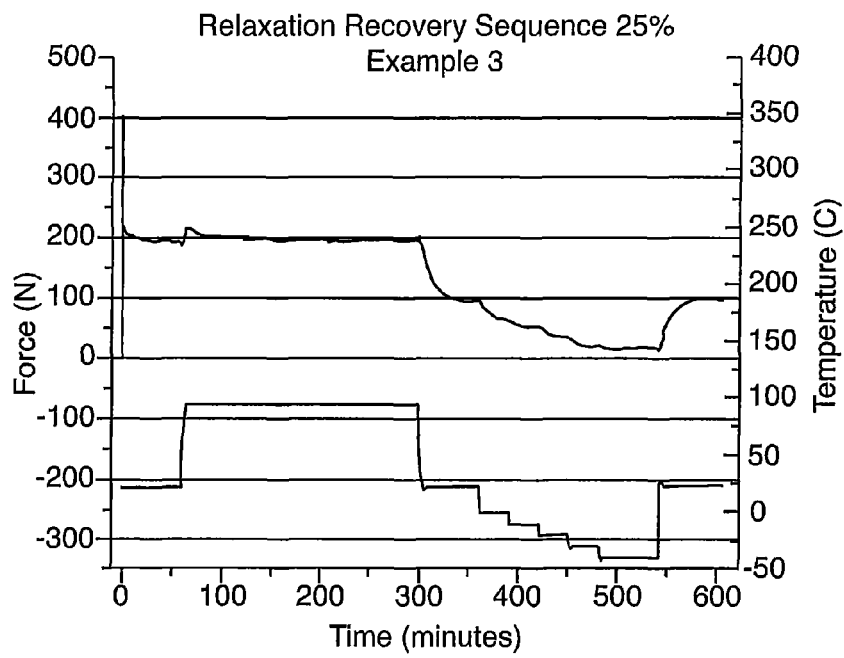
FIG. 1 is a relaxation recovery sequence for the cured material of example 3. The lower plot is temperature at the time shown and the upper plot is sealing force of that cured material at the time shown.

A curable elastomeric sealant composition is a composition that is flowable and can be cured to a cross linked form to provide cured reaction products of the composition that exhibit elastomeric properties. The curable elastomeric sealant composition can include a cross linkable elastomeric oligomer; an initiator or cross-linking agent; a glassy monomer and/or a rubbery monomer; and optionally one or more of a catalyst; a filler; an antioxidant; and an optional reaction modifier. The cross linkable elastomeric sealant composition can be prepared by reacting a cross linkable elastomeric oligomer having a Tg with at least one of a glassy monomer and a rubbery monomer. The cross linkable elastomeric sealant composition can be cured by exposure to conditions and for a time sufficient to at least partially cross-link and cure that composition. Suitable cure conditions, depending on formulation of the cross linkable elastomeric sealant composition include exposure to heat and radiation such as actinic radiation.

Cured reaction products of the composition have a single Tg as measured by Differential Scanning Calorimetry (DSC) and retain a higher sealing force at low temperatures (but above the cured product Tg) as compared to a curable composition made from the same cross linkable elastomeric oligomer but without the glassy and/or rubbery monomer.

Cross Linkable Elastomeric Oligomer

A number of sealant chemistries are believed to be suitable for use in the sealant composition. These chemistries include fluroelastomer; EPDM and other hydrocarbons; styrenic block elastomer; $C_4$ and $C_5$ monomers such as isoprene and isobutylene; acrylates and methacrylates; acrylic emulsion; ethylene acrylate elastomer; functionalized polyacrylate; silylated acrylate; silicone; silylated polyether; silylated polyester; silylated of amide; polyurethane; silylated polyurethane; plastisol and polyvinyl chloride; polysulfide and polythioether; flexible epoxy; vinyl acetate-ethylene latex; unsaturated polyester; polyolefins, amides and acetates for example EVA. Non-curable chemistries such as oleoresinous based (for example linseed oil) sealants and bituminous sealants may also be useful.

The curable elastomeric sealant composition advantageously includes a cross linkable elastomeric oligomer. In one desirable embodiment the cross linkable elastomeric oligomer is a telechelic, polyisobutylene polymer with acrylate moieties at each end (polyisobutylene diacrylate or PIB diacrylate).

Glassy Monomer

The curable elastomeric sealant composition can include a glassy monomer that is reacted with the cross linkable elastomeric oligomer. A glassy monomer has a glass transition temperature above the glass transition temperature of the cross linkable elastomeric oligomer. Typically the glassy monomer has a glass transition temperature above 20° C.

Some examples of glassy monomers include stearyl acrylate (Tg 35° C.); trimethylcyclohexyl methacrylate (Tg 145° C.); isobornyl methacrylate (Tg 110° C.); isobornyl acrylate (Tg 88° C.); and the FANCRYL methacryl esters marketed by Hitachi Chemical Corporation such as dicyclopentanyl-methacrylate (FA-513M Tg 175° C.) and dicyclopentanyl Acrylate (FA-513AS, Tg 140° C.). Other examples of glassy and rubbery monomers are listed in the Tables at the end of the specification.

Rubbery Monomer

The curable elastomeric sealant composition can include a rubbery monomer that is reacted with the cross linkable elastomeric oligomer. A rubbery monomer has a glass transition temperature below the glass transition temperature of the glassy monomer. Typically the rubbery monomer has a glass transition temperature below 20° C. Some examples of rubbery monomers include isooctyl acrylate (Tg −54° C.); isodecyl acrylate (Tg −60° C.); isodecyl methacrylate (Tg −41° C.); n-lauryl methacrylate (Tg −65); and 1,12-dodecanediol dimethacrylate (Tg −37° C.). Other examples of glassy and rubbery monomers are listed in the Tables at the end of the specification.

Initiator or Cross-linking Agent

The curable elastomeric sealant composition can include an initiator or cross-linking agent to at least partially cross-link and cure that composition.

The initiator or cross-linking agent can be a heat-cure initiator or initiator system comprising an ingredient or a combination of ingredients which at the desired elevated temperature conditions produce free radicals. Suitable initiators may include peroxy materials, e.g., peroxides, hydroperoxides, and peresters, which under appropriate elevated temperature conditions decompose to form peroxy free radicals which are initiatingly effective for the polymerization of the curable elastomeric sealant compositions. The peroxy materials may be employed in concentrations effective to initiate curing of the curable elastomeric sealant composition at a desired temperature and typically in concentrations of about 0.1% to about 10% by weight of composition.

Another useful class of heat-curing initiators comprises azonitrile compounds which yield free radicals when decomposed by heat. Heat is applied to the curable composition and the resulting free radicals initiate polymerization of the curable composition. Compounds of the above formula are more fully described in U.S. Pat. No. 4,416,921, the disclosure of which is incorporated herein by reference.

Azonitrile initiators of the above-described formula are readily commercially available, e.q., the initiators which are commercially available under the trademark VAZO from E. I. DuPont de Nemours and Company, Inc., Wilmington, Del.

The initiator or cross-linking agent can be a photoinitiator. Photoinitiators enhance the rapidity of the curing process when the photocurable elastomeric sealant composition is exposed to electromagnetic radiation, such as actinic radiation, for example ultraviolet (UV) radiation. Examples of some useful photoinitiators include, but are not limited to, photoinitiators available commercially from Ciba Specialty Chemicals, under the "IRGACURE" and "DAROCUR" trade names, specifically "IRGACURE" 184 (1-hydroxycyclohexyl phenyl ketone), 907 (2-methyl-1-[4-(methylthio) phenyl]-2-morpholino propan-1-one), 369 (2-benzyl-2-N,N-dimethylamino-1-(4-morpholinophenyl)-1-butanone), 500 (the combination of 1-hydroxy cyclohexyl phenyl ketone and benzophenone), 651 (2,2-dimethoxy-2-phenyl acetophenone), 1700 (the combination of bis(2,6-dimethoxybenzoyl-2,4,4-trimethyl pentyl) phosphine oxide and 2-hydroxy-2-methyl-1-phenyl-propan-1-one), and 819[bis(2,4,6-trimethyl benzoyl) phenyl phosphine oxide] and "DAROCUR" 1173 (2-hydroxy-2-methyl-1-phenyl-propan-1-one) and 4265 (the combination of 2,4,6-trimethylbenzoyldiphenyl-phosphine oxide and 2-hydroxy-2-methyl-1-phenyl-propan-1-one); and the visible light [blue] photoinitiators, dl-camphorquinone and "IRGACURE" 784DC. Of course, combinations of these materials may also be employed herein.

Other photoinitiators useful herein include alkyl pyruvates, such as methyl, ethyl, propyl, and butyl pyruvates, and aryl pyruvates, such as phenyl, benzyl, and appropriately substituted derivatives thereof. Photoinitiators particularly well-suited for use herein include ultraviolet photoinitiators, such as 2,2-dimethoxy-2-phenyl acetophenone (e.g., "IRGACURE" 651), and 2-hydroxy-2-methyl-1-phenyl-1-propane (e.g., "DAROCUR" 1173), bis(2,4,6-trimethyl benzoyl) phenyl phosphine oxide (e.g., "IRGACURE" 819), and the ultraviolet/visible photoinitiator combination of bis (2,6-dimethoxybenzoyl-2,4,4-trimethylpentyl) phosphine oxide and 2-hydroxy-2-methyl-1-phenyl-propan-1-one (e.g., "IRGACURE" 1700), as well as the visible photoinitiator bis ($\eta^5$-2,4-cyclopentadien-1-yl)-bis[2,6-difluoro-3-(1H-pyrrol-1-yl)phenyl]titanium (e.g., "IRGACURE" 784DC). Useful actinic radiation includes ultraviolet light, visible light, and combinations thereof.

Desirably, the actinic radiation used to cure the photocurable elastomeric sealant composition has a wavelength from about 200 nm to about 1,000 nm. Useful UV includes, but is not limited to, UVA (about 320 nm to about 410 nm), UVB (about 290 nm to about 320 nm), UVC (about 220 nm to about 290 nm) and combinations thereof. Useful visible light includes, but is not limited to, blue light, green light, and combinations thereof. Such useful visible lights have a wavelength from about 450 nm to about 550 nm. Photoinitiators can be employed in concentrations effective to initiate curing of the curable elastomeric sealant composition at a desired exposure to actinic radiation and typically in concentrations of about 0.01% to about 10% by weight of composition.

Catalyst

The curable elastomeric sealant composition can include a catalyst to modify speed of the initiated reaction.

Filler

The curable elastomeric sealant composition can optionally include a filler. Some useful fillers include, for example, lithopone, zirconium silicate, hydroxides, such as hydroxides of calcium, aluminum, magnesium, iron and the like, diatomaceous earth, carbonates, such as sodium, potassium, calcium, and magnesium carbonates, oxides, such as zinc, magnesium, chromic, cerium, zirconium and aluminum oxides, calcium clay, fumed silicas, silicas that have been surface treated with a silane or silazane such as the AEROSIL products available from Evonik Industries, silicas that have been surface treated with an acrylate or methacrylate such as AEROSIL R7200 or R711 available from Evonik Industries, precipitated silicas, untreated silicas, graphite, synthetic fibers and mixtures thereof. When used filler can be employed in concentrations effective to provide desired physical properties in the uncured composition and cured reaction products and typically in concentrations of about 0.1% to about 70% by weight of composition.

Antioxidant

The curable elastomeric sealant composition can optionally include an anti-oxidant. Some useful antioxidants include those available commercially from Ciba Specialty Chemicals under the tradename IRGANOX. When used, the antioxidant should be used in the range of about 0.1 to about 15 weight percent of curable composition, such as about 0.3 to about 1 weight percent of curable composition.

Reaction Modifier

The curable elastomeric sealant composition can include a reaction modifier. A reaction modifier is a material that will increase or decrease reaction rate of the curable elastomeric sealant composition. For example, quinones, such as hydroquinone, monomethyl ether hydroquinone (MEHQ), napthoquinone and anthraquinone, may also be included to scavenge free radicals in the curable elastomeric sealant composition and thereby slow reaction of that composition and extend shelf life. When used, the reaction modifier can be used in the range of about 0.1 to about 15 weight percent of curable composition.

Adhesion Promoter

The curable elastomeric sealant composition can include one or more adhesion promoters that are compatible and known in the art. Examples of useful commercially available adhesion promoters include octyl trimethoxysilane (commercially available from Chemtura under the trade designation A-137), glycidyl trimethoxysilane (commercially available from Chemtura under the trade designation A-187), methacryloxypropyl trimethoxysilane (commercially available from Chemtura under the trade designation of A-174), vinyl trimethoxysilane, tetraethoxysilane and its partial condensation products, and combinations thereof. When used, the adhesion promoter can be used in the range of about 0.1 to about 15 weight percent of curable composition.

Rheology Modifiers

The curable elastomeric sealant composition can optionally include a thixotropic agent to modify rheological properties of the uncured composition. Some useful thixotropic agents include, for example, silicas, such as fused or fumed silicas, that may be untreated or treated so as to alter the chemical nature of their surface. Virtually any reinforcing fused, precipitated silica, fumed silica or surface treated silica may be used.

Examples of treated fumed silicas include polydimethylsiloxane-treated silicas, hexamethyldisilazane-treated silicas and other silazane or silane treated silicas. Such treated silicas are commercially available, such as from Cabot Corporation under the tradename CAB-O-SIL ND-TS and Evonik Industries under the tradename AEROSIL, such as AEROSIL R805. Also useful are the silicas that have been surface treated with an acrylate or methacrylate such as AEROSIL R7200 or R711 available from Evonik Industries.

Examples of untreated silicas include commercially available amorphous silicas such as AEROSIL 300, AEROSIL 200 and AEROSIL 130. Commercially available hydrous silicas include NIPSIL E150 and NIPSIL E200A manufactured by Japan Silica Kogya Inc.

When used rheology modifier can be employed in concentrations effective to provide desired physical properties in the uncured composition and cured reaction products and typically in concentrations of about 0.1% to about 70% by weight of composition. coloring agent.

The curable elastomeric composition can be clear to translucent. For some applications a colored composition can be beneficial to allow for inspection of the applied composition. A coloring agent, for example a pigment or dye, can be used to provide a desired color beneficial to the intended application. Exemplary coloring agents include titanium dioxide, C.I. Pigment Blue 28, C.I. Pigment Yellow 53 and phthalocyanine blue BN. In some applications a fluorescent dye can be added to allow inspection of the applied composition under UV radiation. The coloring agent will be present in amounts sufficient to allow for detection. If present, the coloring agent is desirably incorporated in amounts of about 0.002% or more by weight. The maximum amount is governed by considerations of cost and absorption of radiation that interferes with cure of the composition. More desirably, the dye is present in amounts of about 0.002% to about 1.0% weight by weight of the total composition.

The curable elastomeric sealant composition can optionally include other additives at concentrations effective to provide desired properties so long as they do not inhibit the desirable properties such as curing mechanism, elongation, low temperature sealing force, tensile strength, chemical resistance. Example of such optional additives include, for example, reinforcing materials such as fibers, diluents, reactive diluents, coloring agents and pigments, moisture scavengers such as methyltrimethoxysilane and vinyltrimethyloxysilane, inhibitors and the like may be included.

Exemplary Composition Ranges:

A curable elastomeric sealant composition can typically comprise:

about 50 to 99 wt % of a cross linkable elastomeric oligomer;
about 1 to 30 wt % of a glassy monomer;
about 0 to 30 wt % of a rubbery monomer;
about 0.01 to 10 wt% of an initiator or cross-linking agent;
about 0 to 5 wt % of a catalyst;
about 0 to 70 wt % of a filler;
about 0 to 15 wt % of a antioxidant;
about 0 to 15 wt % of a reaction modifier;
about 0 to 15 wt% of adhesion promoter;
about 0 to 70 wt % of rheology modifier;
about 0 to 1.0 wt % of coloring agent.

The glassy monomer(s) and the rubbery monomer(s) can be chosen so that a desired average glass transition temperature for that combination of monomers is obtained. The average glass transition temperature for a combination of monomers is defined by the Fox equation ($1/Tg_{comb}=M_1/Tg_1+M_2/Tg_2$ see T. G. Fox, Bull. Am. Phys. Soc., 1, 123 (1956), the contents of which are incorporated by reference herein.

The ratio of cross linkable elastomeric oligomer to glassy monomer must be chosen to provide sufficient glassy monomer to increase low temperature sealing force of the cured sealant reaction products. However, the ratio must not add so much glassy monomer that the elastomeric properties of the cured sealant reaction products are undesirably affected. Thus, there is a need to balance the ratio of cross linkable elastomeric oligomer to glassy monomer depending on desired properties: too little glassy material and the cured sealant composition will not have a desirable low temperature sealing force but too much glassy material and sealing ability of the cured sealant at higher temperatures is lost.

The ratio of cross linkable elastomeric oligomer to glassy monomer will depend on the oligomer and monomer used; the final application for the sealant; and the cured sealant properties desired for that application. A ratio of cross linkable elastomeric oligomer to glassy monomer in the range of 75:25 to 95:5 respectively provides a general starting point. At present there is no way to predict cured sealant properties for a cross linkable sealant composition formulation. Testing of formulations for low temperature sealing force and higher temperature sealing properties is required to arrive at a formulation and ratio providing desired properties.

Specific physical properties required for the uncured, sealant composition will depend on application. For example, sealant composition viscosity can be formulated for application method and desired cycle time. Viscosity of the uncured sealant composition can be 10,000 Cps to 1,000,000 Cps at 25° C.

Specific physical properties required for cured reaction products of the sealant composition will depend on sealing application, minimum and maximum operating temperatures within the application, desired tensile strength at high temperatures and desired sealing force at low temperatures. Some useful physical properties for the cured reaction products include: Hardness, Shore A about 20 to about 90 and desirably about 40 to about 60. Tensile strength, about 100 psi to about 2,000 psi and desirably about 500 psi to about 1,000 psi. Elongation, about 10% to about 1,000% and desirably about 100% to about 500%. Low temperature (−40° C.) sealing force, about 0 Newtons to about 50 Newtons and desirably about 6 Newtons to about 30 Newtons. Desirably the cured reaction product has a compression set value that allows a seal made therefrom to maintain a predetermined minimum sealing force throughout the design life of the seal.

Components to be sealed by the disclosed curable compositions have a first predetermined sealing surface that is aligned with a second predetermined sealing surface. Typically, the aligned sealing surfaces are in a fixed relationship and move very little relative to each other. The aligned sealing surfaces are generally in fluid communication with a chamber. The seal formed between the aligned sealing surfaces prevents movement of materials between the surfaces and into, or out of, the chamber.

One or both of the sealing surfaces can be machined or formed. The predetermined sealing surfaces are designed to allow a curable composition to be disposed on one or both surfaces during initial assembly of the component to form a seal therebetween. Design of the predetermined sealing surfaces enhances parameters such as alignment of the surfaces, contact area of the surfaces, surface finish of the surfaces, "fit" of the surfaces and separation of the surfaces to achieve a predetermined sealing effect. A predetermined sealing surface does not encompass surfaces that were not identified or designed prior to initial assembly to accommodate a seal or gasket, for example the outside surface of a component over which a repair material is molded or applied to lessen leaking. Sealing surfaces on an engine block and oil pan or engine intake manifold are examples of sealing surfaces in fixed relationship.

The disclosed curable compositions can be in a flowable state for disposition onto at least a portion of one sealing surface to form a seal between the surfaces when they are aligned. The curable composition can be applied as a film over the sealing surface. The curable composition can also be applied as a bead in precise patterns by tracing, screen printing, robotic application and the like. In bead applications the disclosed compositions are typically dispensed as a liquid or semi-solid under pressure through a nozzle and onto the component sealing surface. The nozzle size is chosen to provide a line or bead of composition having a desired width, height, shape and volume. The curable composition can be contained in a small tube and dispensed by squeezing the tube; contained in a cartridge and dispensed by longitudinal movement of a cartridge sealing member; or contained in a larger container such as a 5 gallon pail or 55 gallon drum and dispensed at the point of use by conventional automated dispensing equipment. Container size can be chosen to suit the end use application.

The curable composition can be used to form a formed in place gasket (FIPG). In this application the composition is dispensed onto a first predetermined sealing surface. The first predetermined sealing surface and dispensed composition is aligned and sealingly engaged with a second predetermined sealing surface before the composition has fully cured. The composition will adhere to both sealing surfaces as it cures.

The curable composition can be used to form a cured in place gasket (CIPG). In this application the composition is dispensed onto a first predetermined sealing surface and allowed to substantially cure before contact with a second predetermined sealing surface. The first sealing surface and cured composition is sealingly engaged with the second sealing surface thereby compressing the cured composition to provide a seal between the sealing surfaces. The composition will adhere to only the first sealing surface.

The curable composition can be used to form a mold in place gasket (MIPG). In this application the part comprising the first predetermined sealing surface is placed in a mold. The composition is dispensed into the mold where it contacts the first sealing surface. The composition is typically allowed to cure before removal from the mold. After molding, the first sealing surface and molded composition is sealingly engaged with a second predetermined sealing surface thereby compressing the cured composition to provide a seal between the sealing surfaces. The composition will adhere to only the first sealing surface.

The curable composition can be used in liquid injection molding (LIM). In this application uncured composition is dispensed into a mold without any predetermined sealing surface under controlled pressure and temperature. The composition is typically allowed to cure before removal from the mold. After removal the molded part will retain its shape. In sealing applications the molded gasket is disposed between two predetermined sealing surfaces and compressed to provide a seal between the sealing surfaces.

The following examples are included for purposes of illustration so that the disclosure may be more readily understood and are in no way intended to limit the scope of the disclosure unless otherwise specifically indicated.

Unless otherwise specified the following test procedures were used on cured specimens in the Examples.

| | |
|---|---|
| Shore A hardness | ASTM D2240-05 |
| Tensile strength | ASTM D412-98A |
| modulus | ASTM D412-98A |
| elongation | ASTM D412-98A |
| compression set "A" | ASTM D395. Samples were allowed to cool to room temperature in the uncompressed stated before testing. |
| compression set "B" | ASTM D395 modified. Samples were allowed to cool to room temperature in a compressed state before testing. |
| glass transition Tg | Differential Scanning Calorimetry (DSC). |

Curable, elastomeric gasketing compositions were made. Polyisobutylene diacrylate (PIB diacrylate) is a telechelic, polyisobutylene polymer with acrylate moieties at each end, with a molecular weight of about 1,000 to about 1,000,000 and a very low glass transition temperature (Tg) of −67° C. PIB diacrylate was chosen as the rubber matrix of the elastomeric gasketing compositions. PIB diacrylate can be prepared using a number of known reactions schemes, some of which are listed below and the contents of which are incorporated by reference herein in their entirety. The method of scheme 2 can be used to prepare the PIB diacrylate used in the following compositions.

1. Journal of Polymer Science: Polymer Chemistry Edition, 21, 1033-1044 (1983) Journal of Polymer Science: Polymer Chemistry Edition, 18, 3177-3191 (1980)

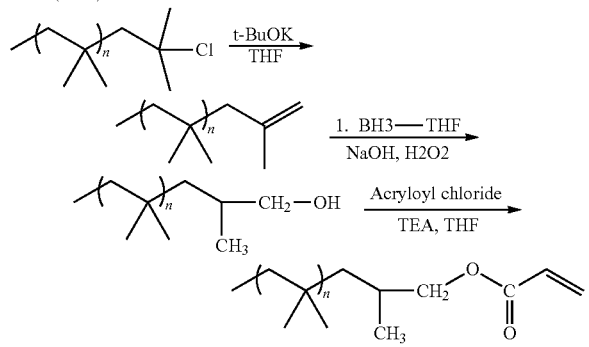

2. Journal of Polymer Science: Part A: Polymer Chemistry, 28, 89-104 (1990)

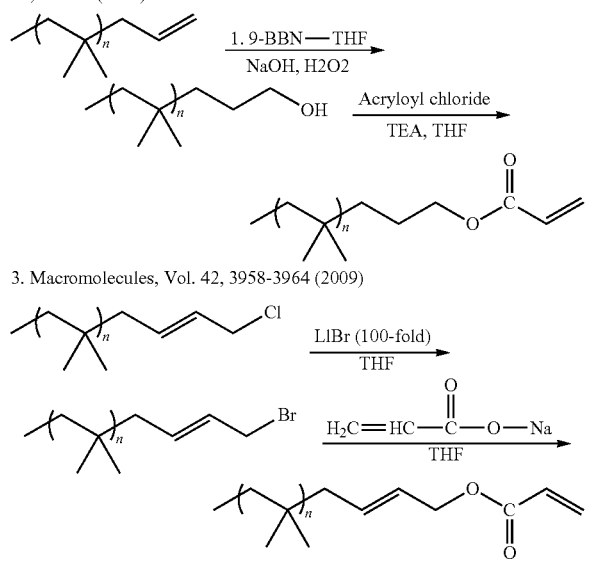

3. Macromolecules, Vol. 42, 3958-3964 (2009)

4. Journal of Polymer Science: Part A: Polymer Chemistry 46, 4236 (2008)

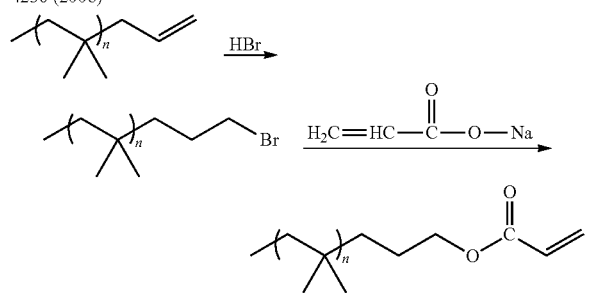

Various acrylates and methacrylates having a Tg greater than 20° C. were selected as the glassy monomer. Various acrylates and methacrylates having a Tg less than 0° C. were selected as the rubbery monomer and as a reactive diluent. The ratio of rubber phase over glass phase was adjusted by trial and error to provide the desired elasticity and sealing force at lower temperature.

Preparation of Curable Gasketing Compositions:
1) Premix preparation: Charge all liquids including initiator, antioxidant, reaction modifier. Mix until no solids remain.
2) Charge elastomeric oligomer into premix. Mix until uniform.
3) Add fillers and mix until uniform.
4) Apply vacuum to degas sample. Discharge bubble free material into storage container.

Examples - curable gasketing composition

| Component | 1 mass (gm) | 2 mass (gm) | 3 mass (gm) | 4 mass (gm) | 5 mass (gm) |
|---|---|---|---|---|---|
| PIB diacrylate | 59.1 | 66.9 | 71.1 | 75.3 | 79.5 |
| FA-513M[1] | 19.7 | 16.7 | 12.6 | 8.4 | 4.2 |
| Irgacure 819[2] | 2.1 | 0.8 | 0.8 | 0.8 | 0.8 |
| Irganox 1010[3] | 0.8 | 0.8 | 0.8 | 0.8 | 0.8 |
| Aerosil R106[4] | 3.8 | 4.1 | 4.1 | 4.1 | 4.1 |
| H30RY[5] | 4.0 | 4.2 | 4.2 | 4.2 | 4.2 |
| diluent[6] | 4.7 | 5.0 | 5.0 | 5.0 | 5.0 |
| viscosity (cps, 25° C., 12/s) | 180000 | 289000 | 456000 | 664500 | 995000 |

[1]Dicyclopentanylmethacrylate glassy monomer marketed by Hitachi Chemical Corporation.
[2]available from Ciba.
[3]available from Ciba.
[4]Available from Evonik.
[5]Available from Wacker.
[6]2 CsT polyalphaolefin diluent.

Typical properties for thermally cured reaction products of Examples

| | 1 | 2 | 3 | 4 | 5 |
|---|---|---|---|---|---|
| Shore A hardness (point) | 64 | 55 | 45 | 42 | 32 |
| Tensile strength (psi) | 1084 | 727 | 543 | 398 | 296 |
| Elongation (%) | 225 | 195 | 174 | 156 | 148 |
| 100% modulus (psi) | 460 | 323 | 264 | 215 | 156 |
| Compression set A (%, 25%) | 9 | 5 | 6 | 7 | 4 |
| Compression set B (%, 25%) | 62 | 41 | 27 | 17 | 11 |

Compression set B values of greater than 0 but less than 40 indicate a cured material may have an advantageous low temperature sealing force. The high compression set B value (62) of Example 1 indicates a cured material that will not maintain desirable sealing force at low temperatures.

| Example (mass, gm) | Tg | 6 | 7 | 8 | 9 | 10 | 11 | 12 |
|---|---|---|---|---|---|---|---|---|
| PIB diacrylate | −67 | 62.7 | 59.1 | 63.8 | 64.8 | 65.9 | 62.7 | 62.7 |
| FA-513M | 175 | | 19.7 | | | | | |
| FA-513AS[1] | 140 | 20.9 | | | | | | |
| isobornyl acrylate | 88 | | | 19.9 | 18.8 | 17.8 | 16 | 16 |
| isobornyl methacrylate | 110 | | | | | | | |
| trimethylcyclohexyl methacrylate | 145 | | | | | | | |
| stearyl acrylate | 35 | | | | | | | |
| isooctyl acrylate | −54 | | | | | | | |

-continued

| | Tg | | | | | | | |
|---|---|---|---|---|---|---|---|---|
| Isodecyl acrylate | −60 | | | 2.6 | 2.6 | 2.6 | | 5.0 |
| Isodecyl methacrylate | −41 | | | | | | | |
| n-lauryl methacrylate | −65 | | | | | | | |
| 1,12-dodecanediol dimethacrylate | −37 | | | | | | | |
| Irgacure 819 | | 0.8 | 2.1 | 0.8 | 0.8 | 0.8 | 0.8 | 0.8 |
| Irganox 1010 | | 0.8 | 0.8 | 0.8 | 0.8 | 0.8 | 0.8 | 0.8 |
| Aerosil R106 | | 4.1 | 3.8 | 4.1 | 4.1 | 4.1 | 4.1 | 2.5 |
| H30Ry | | 4.2 | 3.9 | 4.2 | 4.2 | 4.2 | 4.2 | 4.2 |
| 2 cSt polyalphaolefin diluent | | | | | | | | |
| 9 cSt polyalphaolefin diluent | | | 4.7 | | | | | |
| uncured viscosity (cps, 25° C., 12/s) | | 340,000 | 180000 | 252000 | 284000 | 299000 | 548000 | 181000 |
| Shore A hardness | | 51 | 64 | 44 | 40 | 41 | | 40 |
| tensile strength (psi) | | 623 | 912 | 501 | 469 | 426 | | 436 |
| elongation (%) | | 192 | 226 | 218 | 215 | 202 | | 212 |
| 100% modulus (psi) | | 326 | 388 | 197 | 187 | 187 | | 166 |
| compression set A (% 25%) | | 14 | 25 | 11 | 12 | 11 | | 13 |
| compression set B (% 25%) | | 46 | 72 | 31 | 32 | 30 | | 25 |

| Example (mass, gm) | | 13 | 14 | 15 | 16 | 17 | 18 | 19 |
|---|---|---|---|---|---|---|---|---|
| | Tg | | | | | | | |
| PIB diacrylate | −67 | 62.7 | 62.7 | 62.7 | 62.7 | 62.7 | 62.7 | 62.7 |
| FA-513M | 175 | | | | 10.5 | | | 10.5 |
| FA-513AS | 140 | | | | | | | |
| isobornyl acrylate | 88 | 15.7 | | 15.7 | | | 15.7 | |
| isobornyl methacrylate | 110 | | | | | | | |
| trimethylcyclohexyl methacrylate | 145 | | | | | 10.5 | | |
| stearyl acrylate | 35 | | 11.5 | | | | | |
| isooctyl acrylate | −54 | | | 5.2 | | 10.5 | 5.2 | 10.5 |
| Isodecyl acrylate | −60 | 4.2 | | | 10.5 | | | |
| Isodecyl methacrylate | −41 | | | | | | | |
| n-lauryl methacrylate | −65 | | | | | | | |
| 1,12-dodecanediol dimethacrylate | −37 | 1.0 | | | | | 0.5 | |
| Irgacure 819 | | .8 | 0.4 | 0.8 | 0.8 | 0.8 | 0.8 | 0.8 |
| Irganox 1010 | | .8 | 0.5 | 0.8 | 0.8 | 0.8 | 0.8 | 0.8 |
| Aerosil R106 | | 4.1 | 4.1 | 3.5 | 4.1 | 4.1 | 3.0 | 4.1 |
| H30Ry | | 4.2 | 4.2 | 4.2 | 4.2 | 4.2 | 4.2 | 4.2 |
| 2 cSt polyalphaolefin diluent | | | | | | | | |
| 9 cSt polyalphaolefin diluent | | | | | | | | |
| uncured viscosity (cps, 25° C., 121s) | | 235000 | 175000 | 204000 | 194000 | 130000 | 177000 | 170000 |
| Shore A hardness | | 48 | 36 | 45 | 44 | 41 | 45 | 48 |
| tensile strength (psi) | | 451 | 168 | 484 | 437 | 421 | 534 | 534 |
| elongation (%) | | 158 | 110 | 222 | 208 | 213 | 212 | 231 |
| 100% modulus (psi) | | 251 | 150 | 183 | 187 | 172 | 196 | 198 |
| compression set A (% 25%) | | 15 | 14 | 8 | 14 | 13 | 11 | 23 |
| compression set B (% 25%) | | 34 | 20 | 29 | 33 | 30 | 26 | 40 |

| Example (mass gm) | | 20 | 21 | 22 | 23 | 24 | 25 | 26 |
|---|---|---|---|---|---|---|---|---|
| | Tg | | | | | | | |
| PIB diacrylate | −67 | 62.7 | 62.7 | 62.7 | 62.7 | 62.7 | 62.7 | 62.7 |
| FA-513M | 175 | | | | | | | |
| FA-513AS | 140 | | | | 6.2 | | 6.2 | |
| isobornyl acrylate | 88 | 15.7 | 12.6 | 12.6 | 6.2 | 15.7 | 7.8 | 15.7 |
| isobornyl methacrylate | 110 | | | | | | | |
| trimethylcyclohexyl methacrylate | 145 | | | | | | | |
| stearyl acrylate | 35 | | | | | | | |
| isooctyl acrylate | −54 | 5.2 | | 8.4 | | 5.2 | 5.2 | 5.2 |
| Isodecyl acrylate | −60 | | 6.4 | | 8.4 | | | |
| Isodecyl methacrylate | −41 | | | | | | | |
| n-lauryl methacrylate | −65 | | | | | | | |
| 1,12-dodecanediol dimethacrylate | −37 | 0.5 | 0.5 | 0.5 | 0.5 | 0.5 | 0.5 | 0.5 |
| Irgacure 819 | | 0.8 | 0.8 | 0.8 | 0.8 | 0.8 | 0.8 | 0.8 |
| Irganox 1010 | | 0.8 | 0.8 | 0.8 | 0.8 | 0.8 | 0.8 | 0.8 |
| Aerosil R106 | | 3.0 | 3.0 | 3.0 | 3.0 | 3.0 | 3.0 | 3.0 |
| H30Ry | | 4.2 | 4.2 | 4.2 | 4.2 | 4.2 | 4.2 | 4.2 |
| 2 cSt polyalphaolefin diluent | | | | | | | | |
| 9 cSt polyalphaolefin diluent | | | | | | | | |
| uncured viscosity (cps, 25° C., 12/s) | | 164000 | 166000 | 148000 | 162000 | 177000 | 210000 | 182000 |
| Shore A hardness | | 43 | 44 | 40 | 42 | 45 | 46 | 47 |
| tensile strength (psi) | | 435 | 336 | 409 | 423 | 572 | 515 | 515 |
| elongation (%) | | 188 | 167 | 191 | 186 | 197 | 197 | 187 |

-continued

| | | | | | | | | |
|---|---|---|---|---|---|---|---|---|
| 100% modulus (psi) | | 192 | 181 | 180 | 189 | 222 | 212 | 219 |
| compression set A (% 25%) | | 7 | 5 | 6 | 7 | 7 | 7 | 6 |
| compression set B (% 25%) | | 26 | 21 | 20 | 18 | 23 | 24 | 20 |

| Example (mass, gm) | | 27 | 28 | 29 | 30 | 31 | 32 | 33 |
|---|---|---|---|---|---|---|---|---|
| | Tg | | | | | | | |
| PIB diacrylate | −67 | 62.7 | 62.7 | 62.7 | 62.7 | 62.7 | 62.7 | 62.7 |
| FA-513M | 175 | | 10.5 | 10.5 | | | 12.6 | |
| FA-513AS | 140 | | | | | | | |
| isobornyl acrylate | 88 | | | | 20.9 | | 12.6 | |
| isobornyl methacrylate | 110 | | | | | | | 20.9 |
| trimethylcyclohexyl methacrylate | 145 | | | | | | | |
| stearyl acrylate | 35 | | | | | | | |
| isooctyl acrylate | −54 | | | | | | | |
| Isodecyl acrylate | −60 | | | | | 8.4 | 8.4 | |
| Isodecyl methacrylate | −41 | | | 10.5 | | | | |
| n-lauryl methacrylate | −65 | 20.9 | 10.5 | | | | | |
| 1,12-dodecanediol dimethacrylate | −37 | | | | | | | |
| Irgacure 819 | | 0.8 | 0.8 | 0.8 | 0.8 | 0.8 | 0.8 | 0.8 |
| Irganox 1010 | | 0.8 | 0.8 | 0.8 | 0.8 | 0.8 | 0.8 | 0.8 |
| Aerosil R106 | | 4.1 | 4.1 | 4.1 | 4.1 | 4.1 | 4.1 | 4.1 |
| H30Ry | | 4.2 | 4.2 | 4.2 | 4.2 | 4.2 | 4.2 | 4.2 |
| 2 cSt polyalphaolefin diluent | | 5.0 | | | | | | |
| 9 cSt polyalphaolefin diluent | | | | | | | | |
| uncured viscosity (cps, 25° C., 12/s) | | 69000 | 185000 | 184000 | 292000 | 228000 | 211000 | 345000 |
| Shore A hardness | | 29 | 48 | 53 | 53 | 53 | 43 | 79 |
| tensile strength (psi) | | 217 | 544 | 612 | 812 | 590 | 465 | 1134 |
| elongation (%) | | 157 | 171 | 194 | 217 | 187 | 189 | 213 |
| 100% modulus (psi) | | 118 | 279 | 278 | 293 | 280 | 209 | 526 |
| compression set A (% 25%) | | 7 | 5 | 11 | 4 | 7 | 3 | 11 |
| compression set B (% 25%) | | 11 | 24 | 38 | 26 | 31 | 17 | 61 |

| Example (mass, gm) | | 34 | 35 | 36 | 37 | 38 | 39 | 40 |
|---|---|---|---|---|---|---|---|---|
| | Tg | | | | | | | |
| PIB diacrylate | −67 | 62.7 | 62.7 | 62.7 | 62.7 | 62.7 | 62.7 | 62.7 |
| FA-513M | 175 | | | | | | | |
| FA-513AS | 140 | | | | | | | |
| isobornyl acrylate | 88 | 15.7 | | | 15.7 | 15.7 | 20.9 | 20.9 |
| isobornyl methacrylate | 110 | | | | | | | |
| trimethylcyclohexyl methacrylate | 145 | | 20.9 | | | | | |
| stearyl acrylate | 35 | | | 20.9 | | | | |
| isooctyl acrylate | −54 | 5.2 | | | | | | |
| Isodecyl acrylate | −60 | | | | | | 4.2 | |
| Isodecyl methacrylate | −41 | | | | | | | |
| n-lauryl methacrylate | −65 | | | | | | | |
| 1,12-dodecanediol dimethacrylate | −37 | | | | 5.2 | 1.0 | | |
| Irgacure 819 | | 0.8 | 0.8 | 0.8 | 0.8 | 0.8 | 0.8 | 0.8 |
| Irganox 1010 | | 0.8 | 0.8 | 0.8 | 0.8 | 0.8 | 0.8 | 0.8 |
| Aerosil R106 | | 4.1 | 4.1 | 4.1 | 4.1 | 4.1 | 4.1 | 4.1 |
| H30Ry | | 4.2 | 4.2 | 4.2 | 4.2 | 4.2 | 4.2 | 4.2 |
| 2 cSt polyalphaolefin diluent | | | | | | | | |
| 9 cSt polyalphaolefin diluent | | | | | | | | 4.0 |
| uncured viscosity (cps, 25° C., 12/s) | | 200000 | 200000 | 122000 | 260000 | 226000 | 257000 | 178000 |
| Shore A hardness | | 45 | 69 | 42 | 68 | 50 | 50 | 45 |
| tensile strength (psi) | | 478 | 883 | 218 | 924 | 598 | 614 | 428 |
| elongation (%) | | 179 | 201 | 111 | 100 | 161 | 205 | 191 |
| 100% modulus (psi) | | 235 | 409 | 194 | 824 | 309 | 241 | 189 |
| compression set A (% 25%) | | 5 | 8 | 3 | 6 | 3 | 12 | 14 |
| compression set B (% 25%) | | 21 | 51 | 7 | 41 | 19 | 35 | 30 |

| Example (mass, gm) | | 41 | 42 | 43 | 44 |
|---|---|---|---|---|---|
| | Tg | | | | |
| PIB diacrylate | −67 | 62.7 | 62.7 | 67.5 | 67.4 |
| FA-513M | 175 | | | | |
| FA-513AS | 140 | | | | |
| isobornyl acrylate | 88 | 20.9 | 20.9 | 16.9 | 16.8 |
| isobornyl methacrylate | 110 | | | | |
| trimethylcyclohexyl methacrylate | 145 | | | | |
| stearyl acrylate | 35 | | | | |
| isooctyl acrylate | −54 | | | 5.6 | 5.6 |

-continued

| | | | | |
|---|---|---|---|---|
| Isodecyl acrylate | −60 | 2.6 | | |
| Isodecyl methacrylate | −41 | | | |
| n-lauryl methacrylate | −65 | | | |
| 1,12-dodecanediol dimethacrylate | −37 | | 0.5 | 0.5 |
| lauroyl peroxide | | | | 1.0 |
| Irgacure 819 | | 0.8 | 0.8 | 0.9 |
| Irganox 1010 | | 0.8 | 0.8 | 0.9 | 0.9 |
| Aerosil R106 | | 4.1 | 4.1 | 3.2 | 3.2 |
| H30Ry | | 4.2 | 4.2 | 4.5 | 4.5 |
| 2 cSt polyalphaolefin diluent | | | | | |
| 9 cSt polyalphaolefin diluent | | | | | |
| uncured viscosity (cps, 25° C., 12/s) | | 169000 | 348000 | 177000 | 100000 |
| Shore A hardness | | 43 | 48 | 45 | 44 |
| tensile strength (psi) | | 523 | 612 | 534 | 413 |
| elongation (%) | | 209 | 220 | 212 | 150 |
| 100% modulus (psi) | | 203 | 243 | 196 | 235 |
| compression set A (% 25%) | | 11 | 11 | 11 | |
| compression set B (% 25%) | | 34 | 31 | 26 | |

[1] Glassy monomer marketed by Hitachi Chemical Corporation.

Example 43 is a UV curable composition. Example 43 was formed into samples. The samples were exposed to an UV A radiation source having an intensity of about 1434 mw/cm$^2$ for an energy of about 9872 mJ/cm$^2$. Cured samples of composition 43 had a sealing force at −40° C. of 8N at 25% compression. Example 44 is a thermally curable composition.

The sealing force for example 24 is shown in the table below as a function of temperature and percent compression. The composition in example 24 exhibits typical elastomeric properties. The sealing force at a constant temperature increases as the percent compression is increased, which is expected based on the theory of rubber elasticity as the extension increases. The force, at a constant compression, increases as the temperature is increased. This is also expected based on the temperature dependency defined in the equation of state of rubber elasticity.

Sealing Force (Newtons) vs Compression
UV Cured Polyisobutylene, Example 24

| | Temperature | | |
|---|---|---|---|
| Compression | −40° C. | 23° C. | 95° C. |
| 5% | 3 | 3 | 28 |
| 10% | 3 | 21 | 66 |
| 15% | 5 | 28 | 81 |
| 20% | 6 | 48 | 103 |
| 25% | 9 | 70 | 154 |
| 40% | 18 | 154 | 289 |

The sealing force at −40° C. for several cured films that were compressed twenty-five percent are shown in the table below, titled UV cured Isoprene & PIB Cured-In-Place Gasketing Compositions. It was observed as shown in examples 1, 2 and 3 that the sealing force at −40° C. and 25 percent compression varied significantly as a function of the monomer content as shown in the table and graph below. The step function in change from examples 1, 2, and 3 was surprising and not expected based on observing a single glass transition temperature in the DSC scan. If there was a distinct or separate glassy phase that occurred as a result of the higher glass transition monomer, it should appear as a first or second order thermodynamic transition as measured by DSC. No such first or second order thermodynamic transition is observed in the DSC scans for examples 1, 2 and 3 shown in the figures. High monomer content is desirable to lower the viscosity of the uncured sealant. This allows the sealant to be dispensed quickly while obtaining a cured elastomer with high tensile strength and high elongation. As the monomer content decreases the viscosity increases, tensile strength decreases and the elongation decreases. A high viscosity is undesirable as it is difficult to rapidly dispense the composition. A low elongation is undesirable which can lead to cracks in the seal. A high sealing force at low temperature is desirable as this defines the practical lower limit of ability of the elastomeric seal to perform its intended function over the operating temperature range. The low temperature sealing force, i.e. at −40° C., can be modulated dramatically with changes in the glassy and/or rubbery monomer ratio.

Figure 2:
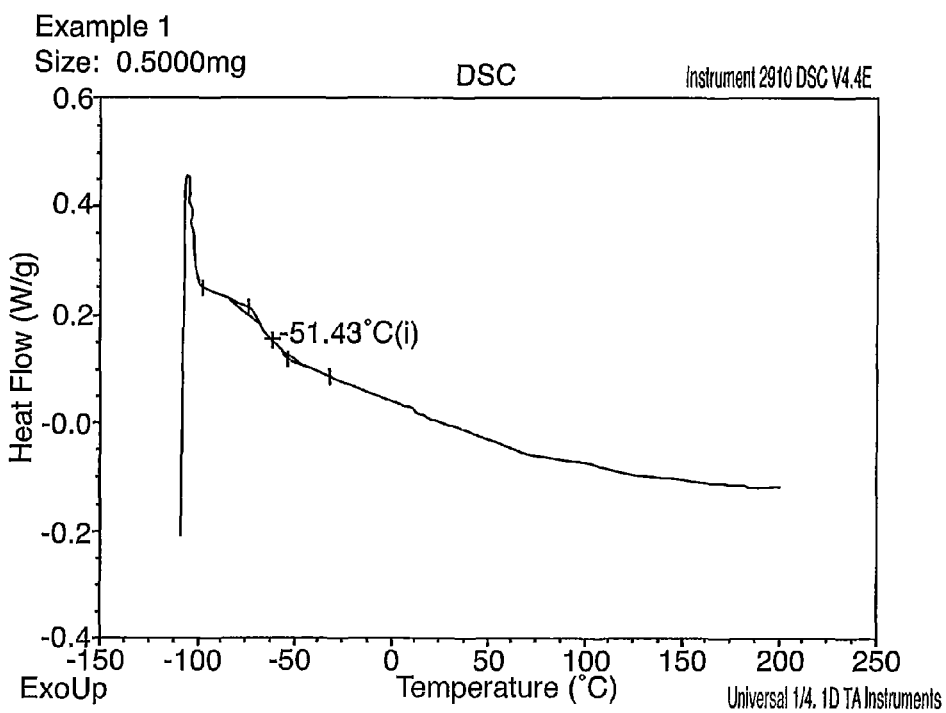
FIG. 2 is a scan from the Differential Scanning Calorimeter analysis of the cured products of composition of Example 1.
Figure 3:
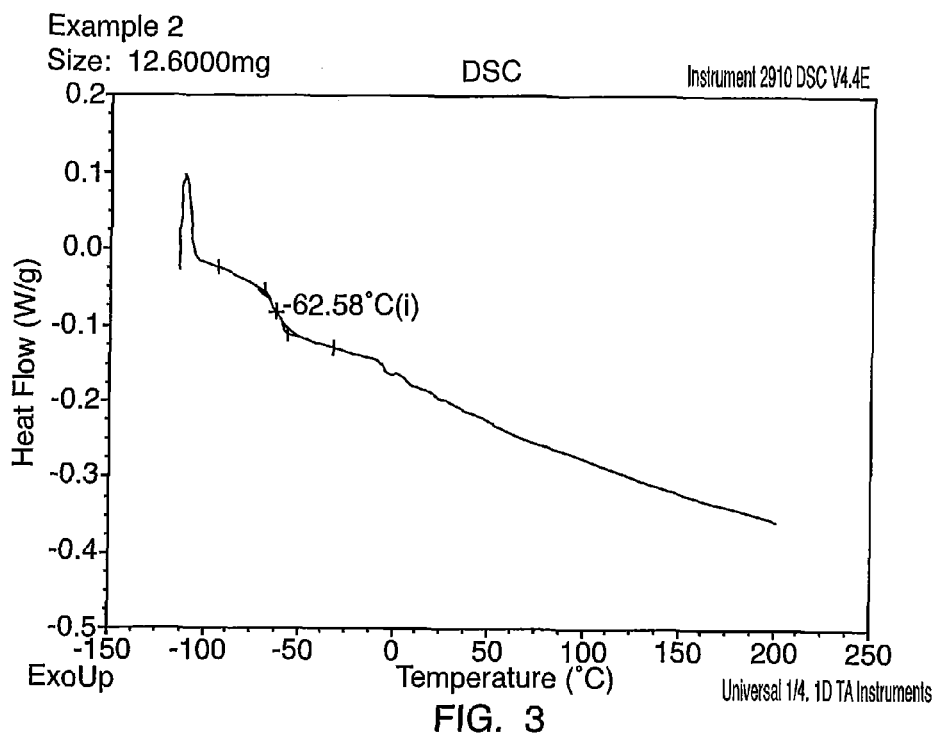
FIG. 3 is a scan from the Differential Scanning Calorimeter analysis of the cured products of composition of Example 2.
Figure 4:
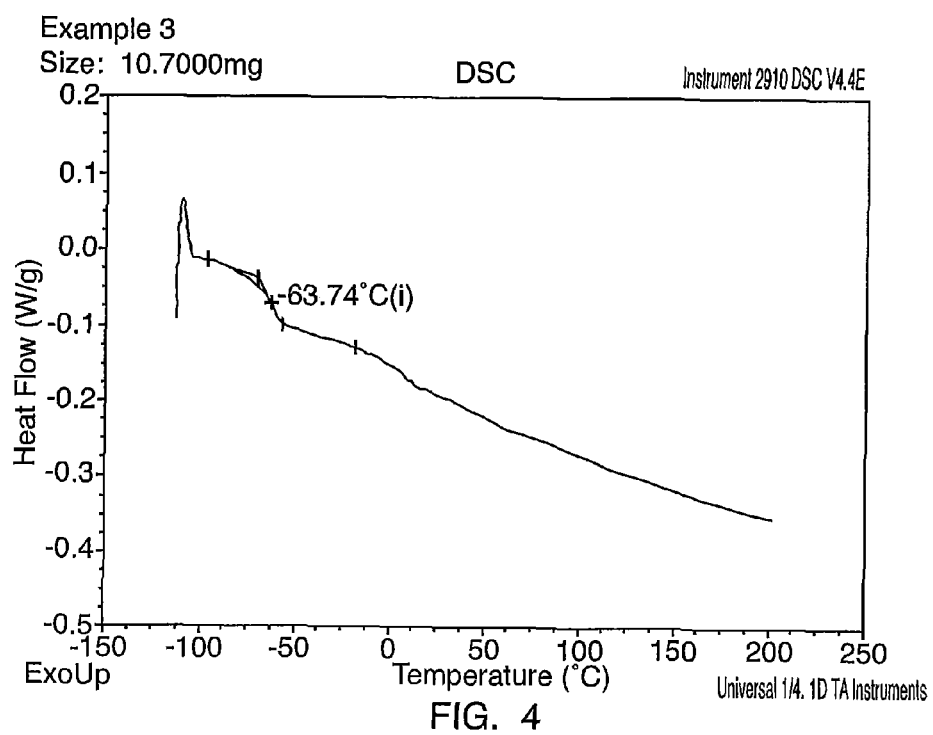
FIG. 4 is a scan from the Differential Scanning Calorimeter analysis of the cured products of composition of Example 3.
Figure 5:
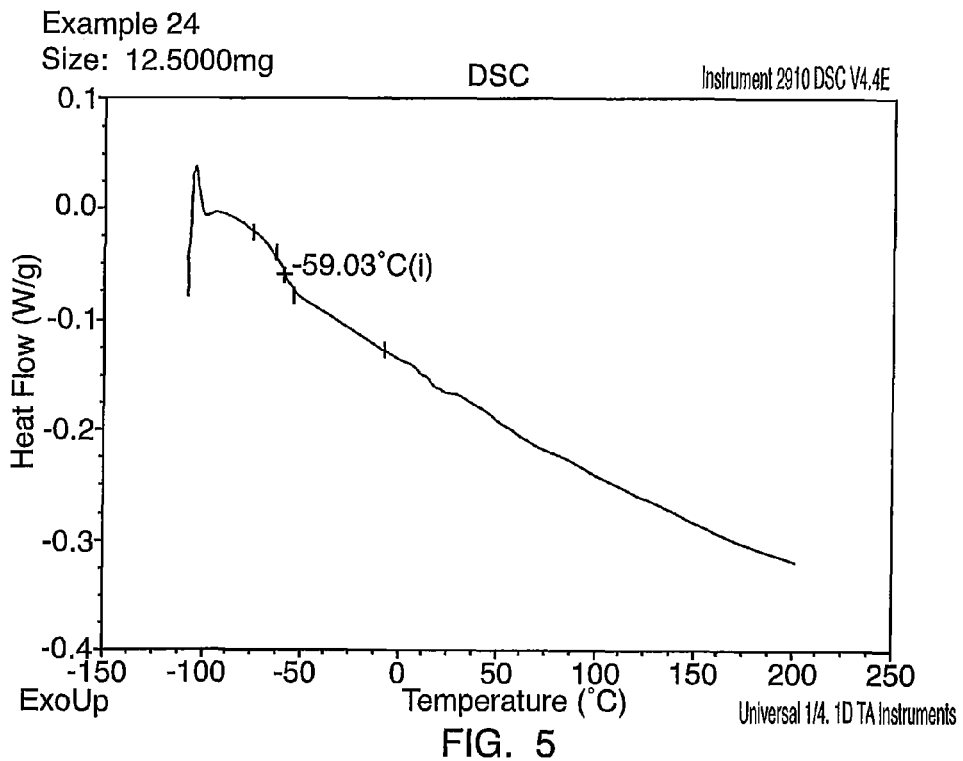
FIG. 5 is a scan from the Differential Scanning Calorimeter analysis of the cured products of composition of Example 24.
Figure 6:
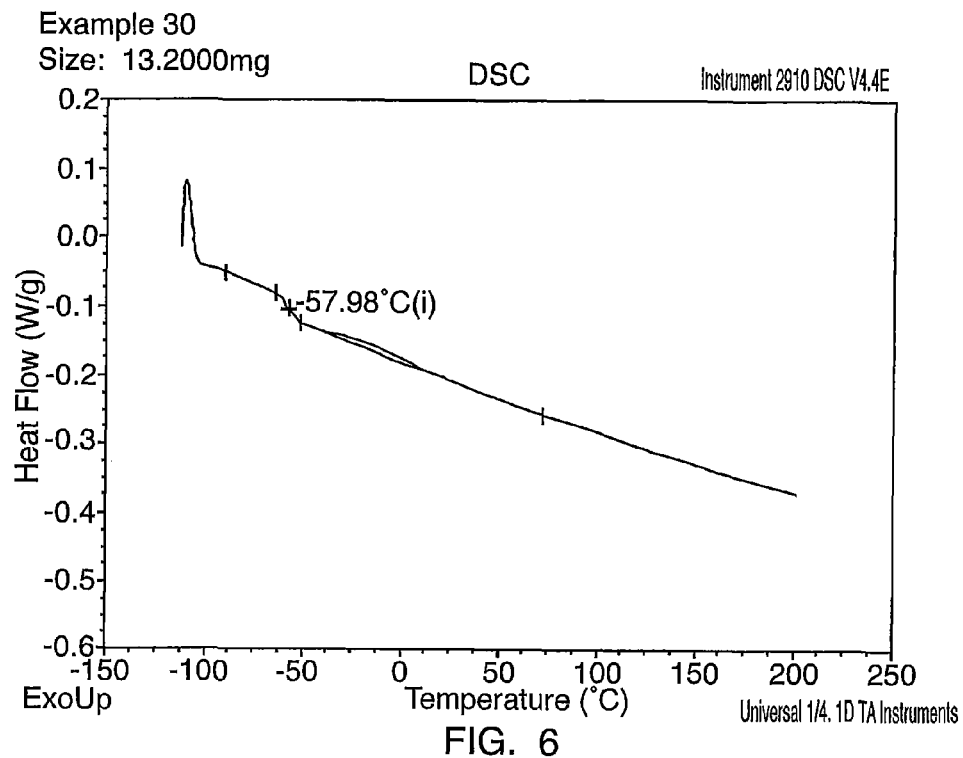
FIG. 6 is a scan from the Differential Scanning Calorimeter analysis of the cured products of composition of Example 30.
Figure 7:
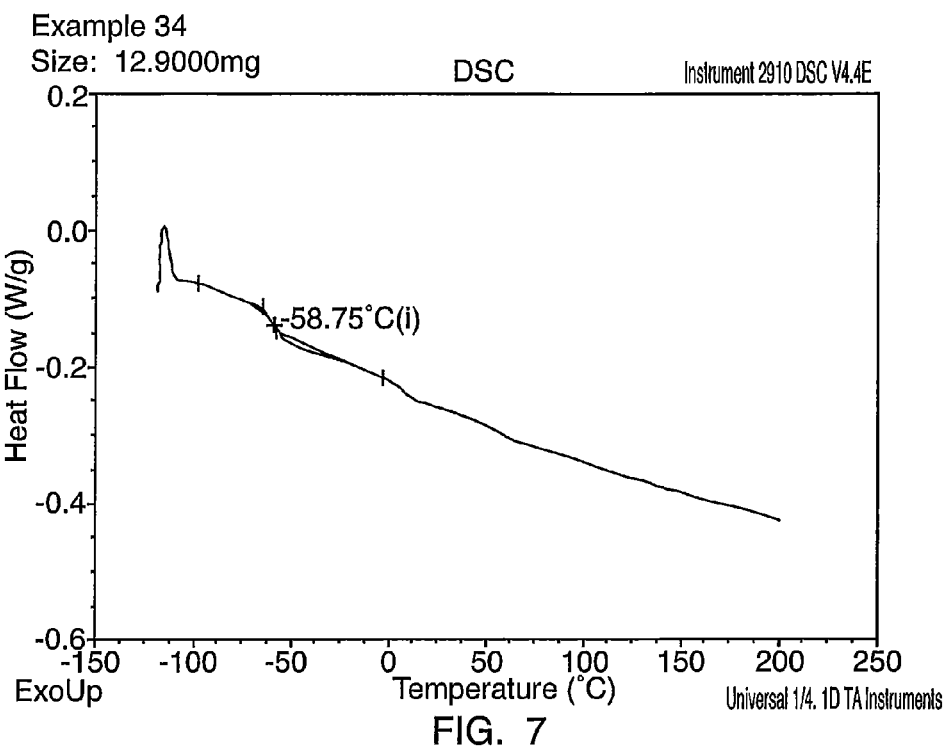
FIG. 7 is a scan from the Differential Scanning Calorimeter analysis of the cured products of composition of Example 34.
Figure 8:
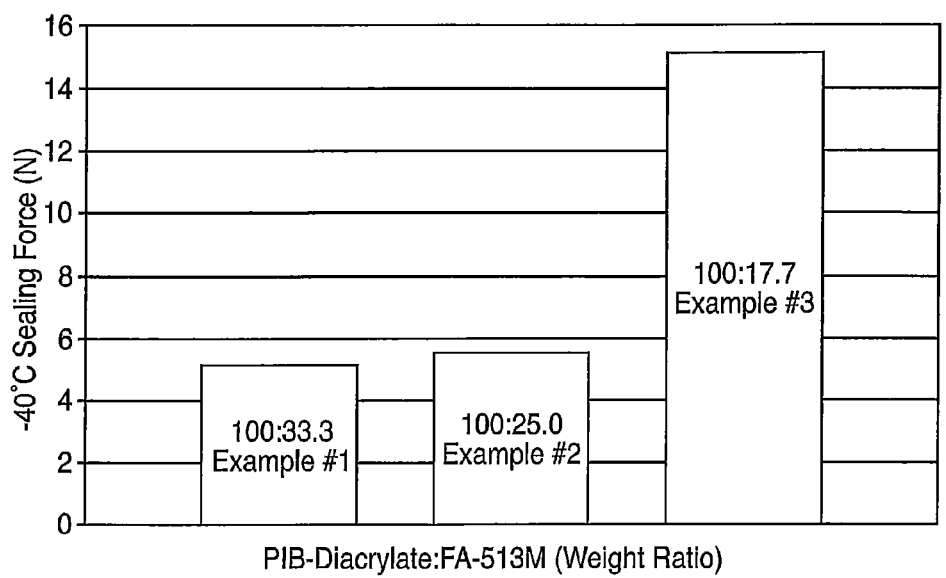
FIG. 8 is a graph showing sealing force at −40° C. for compositions of Examples 1, 2 and 3 having varying oligomer: monomer ratio.

Each of these cured networks exhibited a single glass transition temperature when measured with a differential scanning Calorimetry (DSC) as shown in FIGS. 2, 3 and 4 (Examples 1, 24 and 30).

While preferred embodiments have been set forth for purposes of illustration, the description should not be deemed a limitation of the disclosure herein. Accordingly, various modifications, adaptations and alternatives may occur to one skilled in the art without departing from the spirit and scope of the present disclosure.

UV cured Isoprene & PIB Cured-in-Place Gasketing Compositions
25% Compression Sealing Force

| Example | 45 | 1 | 2 | 3 | 30 | 34 | 24 |
|---|---|---|---|---|---|---|---|
| PIB-D iacrylate I | | 100.0 | 100.0 | 100.0 | 100.0 | 100.0 | 100.0 |
| Kuraray UC-203 | 100.0 | | | | | | |
| FA-513M, Tg = 175° C. | 33.3 | 33.3 | 25.0 | 17.7 | | | |

| UV cured Isoprene & PIB Cured-in-Place Gasketing Compositions 25% Compression Sealing Force | | | | | | | |
|---|---|---|---|---|---|---|---|
| Isobornyl Acrylate Tg = 88° C. | | | | | 33.3 | 25.0 | 25.0 |
| isooctyl acrylate Tg = −54° C. | | | | | | 8.3 | 8.3 |
| Sartomer Ricacryl 3850 | 6.7 | | | | | | |
| 2cst PAO | 8.0 | 8.0 | 7.6 | 7.1 | | | |
| BHT | 1.3 | | | | | | |
| Tinuvin 765 | 1.3 | | | | | | |
| Darocur 1173 | 4.0 | | | | | | |
| 1,12-dodecanediol dimethacrylate | | | | | | | 0.8 |
| Irgacure 819 | 1.3 | 3.6 | 1.2 | 1.1 | 1.3 | 1.3 | 1.3 |
| I-1010 | | 1.3 | 1.3 | 1.2 | 1.3 | 1.3 | 1.3 |
| Aerosil R106 | 6.5 | 6.5 | 6.2 | 5.7 | 6.5 | 6.5 | 4.8 |
| H30RY | 6.7 | 6.7 | 6.3 | 5.9 | 6.7 | 6.7 | 6.7 |
| Total | 169.2 | 159.4 | 147.6 | 138.6 | 149.1 | 149.1 | 148.2 |
| Viscosity (cps, 25° C., 12/s) | 82,100 | 180,200 | 288,700 | 456,600 | 291,900 | 200,200 | 177,200 |
| Shore A, ASTM D2240 | 44 | 64 | 55 | 45 | 53 | 45 | 45 |
| Tensile (psi) ASTM D412 | 871 | 1084 | 727 | 543 | 812 | 478 | 572 |
| Elongation (%) ASTM D412 | 150 | 225 | 195 | 174 | 217 | 179 | 197 |
| 100% modulus (psi), D412 | 483 | 460 | 323 | 264 | 293 | 235 | 222 |
| CS % (25%), ASTM D395 | — | 9 | 5 | 6 | 4 | 5 | 7 |
| CS % (25%), Cooled closed fixture | | 62 | 41 | 27 | 26 | 21 | 26 |
| Tg, Degree ° C. | −61 | −61 | −63 | −64 | −58 | −59 | −59 |
| Other DSC Transitions | none | none | none | none | none | none | none |
| −40° C. force, 25% comp. (Newtons) | 4 | 5 | 6 | 15 | 6 | 11 | 8 |

| Examples of glassy or rubbery monomers. | | | | | | |
|---|---|---|---|---|---|---|
| COMPANY | PRODUCT | DESCRIPTION | CAS # | Tg (° C.) | VISCOSITY (mPa · s) | MW (Da) |
| AkzoNobel | Nourycryl MC 110 | 4-tert-Butylcylco-hexyl Methacryalte | | | | |
| AkzoNobel | Nourycryl MA 123-M50 | Ethylene Ureaethyl Methacrylate 50% in MMA | | | | |
| AkzoNobel | Nourycryl MA 128 | 2,2-Penta-methylene-1,3-oxazolidyl-3)Ethyl-methacryate | | | | |
| Arkema | MA: Methyl Acrylate | Methyl Acrylate | 96-33-3 | 10 | | |
| Arkema | Norsocryl ® Tetrahydrofurfuryl Methacrylate (THFMA) | Tetrahydrofurfuryl Methacrylate | 2455-24-5 | 60 | | |
| Arkema | MATRIFE (Trifluoroethyl methacrylate) | Trifluoroethyl methacrylate | | | | |
| Arkema | Norsocryl ® Methacrylic Anhydride (Norsocryl ®500) | Methacrylic Anhydride | | | | |
| Arkema | LMA: Norsocryl ® Lauryl Methacrylate | Lauryl Methacryalate | 142-90-5 2549-53-3 2495-27-4 | −65 | | |

| | | UV cured Isoprene & PIB Cured-in-Place Gasketing Compositions 25% Compression Sealing Force | | | |
|---|---|---|---|---|---|
| Arkema | SMA: Norsocryl ® Stearyl Methacrylate | Stearyl Methacrylate | 2495-27-4 32360-05-7 | −100 | |
| Arkema | A18-22: Norsocryl ® Acrylate C18-22 | Behenyl Acrylate | 4813-57-4 48076-38-6 18299-85-9 | | |
| Arkema | Norsocryl ®121: Norsocryl ® Acrylate C18-44 in solution in aromatic hydrocarbon solvents (40/60) | Alkyl Acrylate in aromatic hydrocarbon (40/60) | | | |
| Arkema | Norsocryl ®Heptyl Methacrylate (HMA) | Heptyl Methacrylate | | | |
| Arkema | EA: Ethyl Acrylate | Ethyl Acrylate | 140-88-5 | −24 | |
| Arkema | BA: Butyl Acrylate | Butyl Acrylate | 141-32-2 | −54 | |
| Arkema | 2EHA: 2-Ethylhexyl Acrylate | 2-Ethylhexyl Acrylate | 103-11-7 | −70 | |
| Arkema | Norsocryl ®102: 25% MEIO | 2-ethyl (2-oxo-imidazolidin-1-yl) methacrylate (MEIO), an ureido monomer, as two solutions in methyl methacrylate: | | | |
| Arkema | Norsocryl ®104: 50% MEIO | 2-ethyl (2-oxo-imidazolidin-1-yl) methacrylate (MEIO), an ureido monomer, as two solutions in methyl methacrylate: | | | |
| Arkema | Norsocryl ®402: Methoxy PEG 2000 Methacrylate | Methoxy PEG 2000 Methacrylate | | | |
| Arkema | Norsocryl ®405: Methoxy PEG 5000 Methacrylate | Methoxy PEG 5000 Methacrylate | | | |
| Arkema | Norsocryl ®Allyl Methacrylate (AMA) | Allyl Methacrylate | 96-05-9 | | |
| BASF | Dihydrocyclo-penta dienyl Acrylate (DCPA) | Dihydrocyclo-pentadienyl Acrylate | 12542-30-2 | 110 | 204 |
| BASF | Tertiarybutyl acrylate (TBA) | Tertiarybutyl acrylate | 1663-39-4 | 55 | 128 |
| BASF | Cyclohexyl Methacrylate (CHMA) | Cyclohexyl Methacrylate | 101-43-9 | 83 | 168 |
| BASF | Tertiarybutyl methacrylate (TBMA) | Tertiarybutyl methacrylate | 585-07-9 | 107 | 142 |
| BASF | tert-Butyl Methacrylate low acid (TBMA LA) | tert-Butyl Methacrylate low acid | 585-07-9 | 114 | 142 |
| BASF | tert-Butyl Methacrylate low stabilizer (TBMA LS) | tert-Butyl Methacrylate low stabilizer | 585-07-9 | 114 | 142 |
| BASF | Ureido Methacrylate 25% in MMA (UMA 25%) | Ureido Methacrylate 25% in MMA | 86261-90-7 | | 198 |
| BASF | N,N-Dimethylamino-ethyl Methacrylate (DMAEMA) | N,N-Dimethyl-aminoethyl Methacrylate | 2867-47-2 | | 157 |

-continued

UV cured Isoprene & PIB Cured-in-Place Gasketing Compositions
25% Compression Sealing Force

| Supplier | Name | Chemical Name | CAS # | | | |
|---|---|---|---|---|---|---|
| BASF | N,N-Diethylaminoethyl Methacrylate (DEAEMA) | N,N-Dimethylaminoethyl Methacrylate | 105-16-8 | | | 144 |
| BASF | tert-Butylaminoethyl Methacrylate (TBAEMA) | tert-Butylaminoethyl Methacrylate | 3775-90-4 | | | 185 |
| BASF | Hydroxypropyl acrylate (HPA) | Hydroxypropyl acrylate | 25584-83-2 | 24 | | |
| BASF | 2-Ethylhexyl acrylate (2-EHA) | 2-Ethylhexyl acrylate | 103-11-7 | | | |
| BASF | 4-Hydroxybutyl acrylate (4HBA) | 4-Hydroxybutyl acrylate | 2478-10-6 | | | 144 |
| BASF | Ethyldiglycol acrylate (EDGA) | Ethyldiglycol acrylate | 7328-17-8 | | | 188 |
| BASF | Allyl Methacrylate (MA) | Allyl Methacrylate | 96-05-9 | 52 | | 126 |
| BASF | Behenyl Acrylate (BEA) | Behenyl Acrylate | 4813-57-4 (C18) | | | 325 |
| BASF | Lauryl Methacrylate (LMA) | Lauryl Methacrylate | 142-90-5 (C12) 2549-53-3 (C14) 2495-27-4 (C16) | | | |
| BASF | Stearyl Methacrylate (SMA) | Stearyl Methacrylate | 2495-27-4 (C16) 32360-05-7 (C18) | | | |
| BASF | Behenyl Methacrylate (BEMA) | Behenyl Methacrylate | 32360-05-7 (C18) 45294-18-6 (C20) 16669-27-5 (C22) | | | |
| BASF | Stearyl Acrylate (SA) | Stearyl Acrylate | 4813-57-4 (C16) 13402-02-3 (C18) | | | 296 |
| BASF | Lauryl acrylate (LA) | Lauryl acrylate | 2156-97-0 | −3 | | 240 |
| | Butyl acrylate (BA) | Butyl acrylate | 141-32-2 | −43 | | 128 |
| | Isodecyl Acrylate (IDA) | Isodecyl Acrylate | 1330-61-6 | −60 | | |
| BASF | Isobutyl acrylate (IBA) | Isobutyl acrylate | 106-63-8 | | | 128 |
| | Hydroxyethyl acrylate (HEA) | Hydroxyethyl acrylate | 818-61-1 | −15 | | 116 |
| | 2-Propylheptyl Acrylate high grade (2-PHA HG) | 2-Propylheptyl Acrylate high grade | 149021-58-9 | −7 | | 130 |
| BASF | 2-Propylheptyl Acrylate techn. (2-PHA TG) | 2-Propylheptyl Acrylate techn. | 149021-58-9 | −7 | | 130 |
| | Methacrylic Acid (MAA) | Methacrylic Acid | 79-41-4 | 228 | 1.4 | 86 |
| | tert-Butyl Methacrylate (TBMA) | tert-Butyl Methacrylate | 585-07-9 | 107 | 0.93 | 142 |
| Bimax | BETA-C | 2-Carobxyethyl Acrylate | 24615-84-7 | <30 | — | 144 |
| Bimax | BX-ADMA | 1-Adamantyl Methacrylate | 16887-36-8 | — | viscous liq. | 220 |
| Bimax | BX-PTEA | Phenylthioethyl Acrylate | 95175-38-5 | — | — | 208 |
| Bimax | BX-DMANPA | Dimethylaminoneopentyl acrylate | 20166-73-8 | | | 285 |

-continued

UV cured Isoprene & PIB Cured-in-Place Gasketing Compositions
25% Compression Sealing Force

| Supplier | Product | Chemical | CAS | | | |
|---|---|---|---|---|---|---|
| Bimax | BX-NASME | N-Acryloyl sarcosine methyl ester | 72065-23-7 | | | 157 |
| Bimax | BX-BHPEA | 2-(4-Benzoyl-3-hydroxyphenoxy) ethyl acrylate | 16432-81-8 | | | 312 |
| Bimax | BX-AHBP | 4-Allyloxy-2-hydroxy benzophenone | 2549-87-3 | | | 254 |
| Bimax | BX-DCPA | Dicyclopentenyl acrylate | 33791-58-1 | | | 204 |
| Bimax | BX-DCPMA | Dicyclopentenyl methacrylate | 51178-59-7 | | | 218 |
| Bimax | BX-HEMA | 2-Hydroxyethyl methacrylate | 868-77-9 | | | 130 |
| Bimax | BX-EOEMA | 2-Ethoxyethyl methacrylate | 2370-63-0 | | | 158 |
| Bimax | BX-TFEMA | Trifluoroethyl methacrylate | 352-87-4 | | | 168 |
| Bimax | BX-MAA | Methacrylic acid | 79-41-4 | | | 86 |
| Bimax | HEMA-5 | Polyethoxy (5) methacrylate 95% active | | | | |
| Bimax | HEMA-10 | Polyethoxy (10) methacrylate 90% active | | | | |
| Bimax | BEM-25 | Behenylpolyethoxy (25) methacrylate 93% active | | | waxy solid | |
| Bimax | LEM-23 | Laurylpolyethont (23) methacrylate 93% active | | | | |
| Bimax | MPEM-7 | Methoxypolyethoxy (7) methacrylate 95% active | | | | |
| Bimax | MPEM-12 | Methoxypolyethoxy (12) methacrylate 95% active | | | | |
| Bimax | MPEM-16 | Methoxypolyethoxy (16) methacrylate 95% active | | | | |
| Bimax | Development product 2 | 3-PHENOXY-2-HYDROXY PROPYL METHACRYLATE | | | | |
| Bimax | Development product 3 | METHOXYETH-OXYETHYL METHACRYLATE | | | | |
| Cytec | B-CEA | β-carboxyethyl acrylate | 24615-84-7 | <30 | 75 | 144 |
| Cytec | IBO-A | Isobornyl Acrylate | 5888-33-5 | 95 | 9 | 208 |
| Cytec | EBECRYL 110 | Oxyethylated Phenol Acrylate | 56641-05-5 | −8 | 13-27 | 236 |
| Cytec | EBECRYL 113 | Mono-functional aliphatic epoxy acrylate | | 6 | 90-150 | |
| Cytec | EBECRYL 114 | 2-Phenoxyethyl Acrylate | 48145-04-6 | 5 | 20 max | 192 |
| Cytec | EBECRYL 1039 | Urethane Mono Acrylate | | | 20-50 | |
| Cytec | ODA-N | Octyl/Decyl Acrylate | 2499-59-4 2156-96-9 | −65 | 2-3 | 184 312 |
| Dow Chemical | Glacial Acrylic Acid (GAA) 99.0% | Glacial Acrylic Acid | 79-10-7 | 106 | 1.2 | 72 |
| Dow Chemical | Methyl Acrylate (MA) | Methyl Acrylate | 96-33-3 | 8 | 0.5 | 86 |
| Dow Chemical | Glacial Acrylic Acid (GAA-FG) Floculant Grade 99.6% | Glacial Acrylic Acid | 79-10-7 | 106 | 1.2 | 72 |
| Dow Chemical | Ethyl Acrylate (EA) | Ethyl Acrylate | 140-88-5 | −71 | 0.6 | 100 |
| Dow Chemical | Butyl Acrylate (BA) | Butyl Acrylate | 141-32-2 | −54 | 0.9 | 128 |

-continued

UV cured Isoprene & PIB Cured-in-Place Gasketing Compositions
25% Compression Sealing Force

| | | | | | | |
|---|---|---|---|---|---|---|
| Dow Chemical | 2-Ethylhexyl Acrylate (2-HEA) | 2-Ethylhexyl Acrylate | 103-11-7 | −85 | 1.7 | 184 |
| Hitachi | FA-512M (500-600 ppm MEHQ) | Dicyclopentenyl-oxyethyl Methacrylate | 68586-19-6 | 40-50 | 15-20 | 262 |
| Hitachi | FA-512MT (325-375 ppm PTZ + 22-28 ppm HQ) | Dicyclopentenyl-oxyethyl Methacrylate | 68586-19-6 | 40-50 | 15-20 | 262 |
| Hitachi | FA-THFA | Tetrahydrofurly Acrylate | 2399-48-6 | — | 1-5 | 156 |
| Hitachi | FA-BZA | Benzyl Acrylate | 2495-35-4 | — | 3-8 | 162 |
| Hitachi | FA-THFM | Tetrahydrofurfyl Methacrylate | 2455-24-5 | — | 8-18 | 170 |
| Hitachi | FA-BZM | Benzyl Methacrylate | 2495-37-6 | — | 2-3.5 (20° C.) | 176 |
| Hitachi | FA-310A | Phenoxyethyl Acrylate | 48145-04-6 | — | 3-13 | 192 |
| Hitachi | FA-711MM | Pentamethyl-piperldinyl Methacrylate | 68548-08-3 | — | 11-14 | 239 |
| Hitachi | FA-314A | Nonylphenoxy-polyethylene Glycol Acrylate | 50974-47-5 | — | 120-180 | 452 |
| Hitachi | FA-318A | Nonylphenoxy-polyethylene Glycol Acrylate | 50974-47-5 | — | 120-180 | 626 |
| Hitachi | FA-511AS | Dicyclopentenyl Acrylate | 33791-58-1 | 10-15 | 8-18 | 204 |
| Hitachi | FA-512AS | Dicyclopentenyl-oxyethyl Acrylate | 65983-31-5 | 10-15 | 15-25 | 248 |
| Hitachi | FA-513M | Dicyclopentanyl Methacrylate | 34759-34-7 | 175 | 7-17 | 220 |
| Hitachi | FA-513AS | Dicyclopentanyl Acrylate | 79637-74-4 | 120 | 7-17 | 206 |
| Hitachi | FA-310M | Phenoxyethyl Methacrylate | 10595-06-9 | 36 | 3-13 | 206 |
| Hitachi | FA-712HM | Tetramethyl-piperldinyl Methacrylate | 31582-45-3 | — | 3-6 (60° C.) | 225 |
| Hitachi | FA-400M(100) | Methoxy Polyethylene Glycol Methacrylate | 26915-72-0 | — | 20-30 | 496 |
| Jarchem | Jarchem ® LA | Lauryl Acrylate | 2156-97-0 | | | |
| Jarchem | Jarchem ® LMA | Lauryl Methacrylate | 142-90-5 | | | |
| Jarchem | Jarchem ® SA | Stearyl Acrylate | 4813-57-4 | | | |
| Jarchem | Jarchem ® SMA | Stearyl Methacrylate | 32360-05-7 | | | |
| Kyyoeisha | LIGHT ESTER BZ | Benzyl methacrylate | 2495-37-6 | 54 | 3 | |
| Kyyoeisha | LIGHT ESTER IB | Isobutyl methacrylate | 97-86-9 | 48 | 2 | |
| Kyyoeisha | LIGHT ESTER G | Glycidyl methacrylate | 106-91-2 | 46 | | |
| Kyyoeisha | LIGHT ESTER S | n-Stearyl methacrylate | 32360-05-7 | 38 | 9 | |
| Kyyoeisha | LIGHT ESTER HOP(N) | 2-Hydroxpropyl methacrylate | 923-26-2 | 26 | 10 | |
| Kyyoeisha | LIGHT ESTER DE | Diethylaminoethyl methacrylate | 105-16-8 | 20 | | |
| Kyyoeisha | LIGHT ESTER NB | n-Butyl metacrylate | 97-88-1 | 20 | | |
| Kyyoeisha | LIGHT ESTER DM | Dimethylamino-ethyl methacrylate | 2867-47-2 | 18 | 3 | |
| Kyyoeisha | EPDXY ESTER M-600A | 2-hydroxy 3-phenoxy propyl acrylate | 16969-10-1 | 17 | 175 | |
| Kyyoeisha | LIGHT ACRYLATE L-A | Lauryl acrylate | 2156-97-0 | −3 | 4 | |
| Kyyoeisha | LIGHT ESTER HOP-A(N) | 2-Hydroxypropyl acrylate | 25584-83-2 | −7 | 6 | |
| Kyyoeisha | LIGHT ESTER HOP-A(N) | 2-Hydroxypropyl acrylate | 25584-83-2 | −7 | | |

| | | UV cured Isoprene & PIB Cured-in-Place Gasketing Compositions 25% Compression Sealing Force | | | | |
|---|---|---|---|---|---|---|
| Kyyoeisha | LIGHT ESTER EH | 2-Ethyl hexyl methacrylate | 688-84-6 | −10 | 3 | |
| Kyyoeisha | LIGHT ESTER HOA(N) | 2-Hydroxyethyl acrylate | 818-61-1 | −15 | 5 | |
| Kyyoeisha | LIGHT ESTER HOA(N) | 2-Hydroxyethyl acrylate | 818-61-1 | −15 | | |
| Kyyoeisha | LIGHT ACRYLATE PO-A | Phenoxy ethyl acrylate | 48145-04-6 | −22 | 13 | |
| Kyyoeisha | LIGHT ACRYLATE P-200A | Phenoxy polyethylene-glycol acrylate | 56641-05-5 | −25 | 11 | |
| Kyyoeisha | HOA-MS(N) | 2-Acryloyloxy ethyl succunate | 50940-49-3 | −40 | 180 | |
| Kyyoeisha | LIGHT ESTER ID | Isodecyl methacrylate | 29964-84-9 | −41 | | |
| Kyyoeisha | LIGHT ACRYLATE IAA | Isoamyl acrylate | 4245-35-6 | −45 | 2 | |
| Kyyoeisha | LIGHT ACRYLATE MTG-A | Methoxy triethylene-glycol acrylate | 32171-39-4 | −50 | 6 | |
| Kyyoeisha | LIGHT ESTER L | n-Lauryl methacrylate | 142-90-5 | −65 | 6 | |
| Kyyoeisha | LIGHT ACRYLATE EC-A | Ethoxy diethyleneglycol acrylate | 7328-17-8 | −70 | 5 | |
| Kyyoeisha | HOA-MPE(N) | 2-Acryloyloxy ethyl 2-hydroxy ethyl phthalate | 38056-88-1 | | 800 | |
| Kyyoeisha | LIGHT ACRYLATE P-1A(N) | 2-Acryloyloxy ethyl phosphate | 32120-16-4 | | 23000 | |
| Kyyoeisha | HOA-MPL(N) | 2-Acryloyloxy ethyl phthalate | 30697-40-6 | | 7500 | |
| Kyyoeisha | LIGHT ACRYLATE HOA-HH(N) | 2-Acryloyloxy-ethyl hexahydro phthalete | 57043-35-3 | | 6000 | |
| Kyyoeisha | LIGHT ACRYLATE EHDG-AT | 2-Ethyl hexyl diglycol acrylate | 117646-83-0 | | 7 | |
| Kyyoeisha | LIGHT ACRYLATE HOB-A | 2-Hydroxy butyl acrylate | 2421-27-4 | | 9 | |
| Kyyoeisha | LIGHT ESTER HOB(N) | 2-Hydroxybutyl methacrylate | 13159-51-8 | | | |
| Kyyoeisha | LIGHT ESTER P-1M | 2-Methacryloyloxy-ethyl acid phoshate | 52628-03-2 5250 | | | |
| Kyyoeisha | LIGHT ESTER HO-HH(N) | 2-Methacryloyl-oxyethyl hexahydrophthalate | 51252-88-1 | | | |
| Kyyoeisha | LIGHT ESTER HO-MS(N) | 2-Methacryloyl-oxyethyl succynic acid | 20882-04-6 | | | |
| Kyyoeisha | LIGHT ESTER PO | 2-Phenoxy ethyl methacrylate | 10595-06-9 | | 7 | |
| Kyyoeisha | LIGHT ESTER L-7 | Alkyl(C12~C13) methacrylate C12? + 045%, C12? + 055% | 142-90-5/ 2495-25-2 | | | |
| Kyyoeisha | LIGHT ACRYLATE NP-4EA | Arcylate of ethyleneoxide modified nonylphenol | 50974-47-5 | | 100 | |
| Kyyoeisha | LIGHT ESTER BC | Butoxy diethyleneglycol methacrylate | 7328-22-5 | | | |
| Kyyoeisha | LIGHT ACRYLATE DPM-A | Methoxy dipropylene-glycol acrylate | 83844-54-6 | | 3 | |

| | | | UV cured Isoprene & PIB Cured-in-Place Gasketing Compositions 25% Compression Sealing Force | | | |
|---|---|---|---|---|---|---|
| Kyyoeisha | LIGHT ACRYLATE 130A | Methoxy polyethylene-grycol acrylate | 32171-39-4 | | 25 | |
| Kyyoeisha | LIGHT ESTER 130MA | Methoxy polyethylene-grycol acrylate | 26915-72-0 | | 25 | |
| Kyyoeisha | LIGHT ESTER 041MA | Methoxy polyethylene-grycol acrylate | 26915-72-0 | | | |
| Kyyoeisha | LIGHT ACRYLATE BA-104 | Neopenthylglycol benzoate acrylate | 66671-22-5 | | 70 | |
| Kyyoeisha | LIGHT ACRYLATE P2H-A | Phenoxy diethylene-glycol acrylate | 61630-25-9 | | 11 | |
| Kyyoeisha | LIGHT ACRYLATE S-A | Stearyl acrylate | 4813-57-4 | | 9 | |
| Kyyoeisha | LIGHT ACRYLATE THF-A | Tetrahydrofurfuryl acrylate | 2399-48-6 | | 5 | |
| Kyyoeisha | LIGHT ESTER M-3F | Trifluoroethyl methacrylate | 352-87-4 | | 3 | |
| Kyyoeisha | LIGHT ACRYLATE DCP-A | Dimethylol tricylcodecane diacrylate | 352-87-4 | | | |
| Lucite | Methyl Methacrylate (MMA) | Methyl Methacrylate | 80-62-6 | 105 | 0.56 | 100 |
| Mitsubishi Rayon | Methyl Methacrylate (MMA) | Methyl Methacrylate | 80-62-6 | 105 | 0.56 | 100 |
| Mitsubishi Rayon | Cyclohexyl Methacrylate (CHMA) | Cyclohexyl Methacrylate | 101-43-9 | 83 | 2.5 | 168 |
| Mitsubishi Rayon | Ethyl Methacrylate (EMA) | Ethyl Methacrylate | 97-63-2 | 65 | 0.62 | 114 |
| Mitsubishi Rayon | 2-Hydoxyethyl Methacrylate (HEMA) | 2-Hydoxyethyl Methacrylate | 868-77-9 | 55 | 6.8 | 130 |
| Mitsubishi Rayon | Benzyl Methacrylate (BZMA) | Benzyl Methacrylate | 2495-37-6 | 54 | 2.7 | 176 |
| Mitsubishi Rayon | Allyl Methacrylate (AMA) | Allyl Methacrylate | 96-05-9 | 52 | 1.1 | 126 |
| Mitsubishi Rayon | iso-Butyl Methacrylate (IBMA) | iso-Butyl Methacrylate | 97-86-9 | 48 | 0.88 | 142 |
| Mitsubishi Rayon | Glycidyl Methacrylate (GMA) | Glycidyl Methacrylate | 106-91-2 | 46 | 2.5 | 142 |
| Mitsubishi Rayon | Hydroxypropyl Methacrylate (HPMA) | Hydroxypropyl Methacrylate | 27813-02-1 | 26 | 9.3 | 144 |
| Mitsubishi Rayon | n-Butyl Methacrylate (BMA) | n-Butyl Methacrylate | 97-88-1 | 20 | 0.92 | 142 |
| Mitsubishi Rayon | Diethylamino-ethyl Methacrylate (DEMA) | Diethylamino-ethyl Methacrylate | 105-16-8 | 16~24 | 1.8 | 185 |
| Mitsubishi Rayon | Dimethylamino-ethyl Methacrylate (DMMA) | Dimethyl-aminoethyl Methacrylate | 2867-47-2 | 18 | 1.3 | 157 |
| Mitsubishi Rayon | 2-Ethylhexyl Methacrylate (EHMA) | 2-Ethylhexyl Methacrylate | 688-84-6 | −10 | 1.85 | 198 |
| Mitsubishi Rayon | 2-Ethoxyethyl Methacrylate (ETMA) | 2-Ethoxyethyl Methacrylate | 2370-63-0 | −31 | 3.5 | 158 |
| Mitsubishi Rayon | Tridecyl Methacrylate (TDMA) | Tridecyl Methacrylate | 2495-25-2 | −46 | 5.8 | 268 |

| | | UV cured Isoprene & PIB Cured-in-Place Gasketing Compositions 25% Compression Sealing Force | | | | | |
|---|---|---|---|---|---|---|---|
| Mitsubishi Rayon | Alkyl Methacrylate (SLMA) | Alkyl Methacrylate | 142-90-5 2495-25-2 | −62 | 5.1 | 263 (avg) |
| Mitsubishi Rayon | Lauryl Methacrylate (LMA) | Lauryl Methacrylate | 142-90-5 | −65 | 4.6 | 255 |
| Mitsubishi Rayon | Stearyl Methacrylate (SMA) | Stearyl Methacrylate | 32360-05-7 | −100 | 8.2 (@30° C.) | 339 |
| Mitsubishi Rayon | 2-Methoxyethyl Methacrylate (MTMA) | 2-Methoxyethyl Methacrylate | 6976-93-8 | | | 144 |
| Mitsubishi Rayon | Tertahydro-furfuryl Methacrylate (THFMA) | Tertahydrofurfuryl Methacrylate | 2455-24-5 | | | 170 |
| MRC Unitec | TBCHMA | 4-tbutylcyclohexyl methacrylate | 46729-07-1 | | | 224 |
| MRC Unitec | MBP | 4-methacryloxyoxy-benzophenone | 56467-43-7 | | solid | 266 |
| MRC Unitec | MEU | 2-(methacryloxy-oxyaceamido-ethylene) N,N'-ethyleneurea | 3089-23-4 | | solid | 255 |
| Nippon Kasei | (CHDMMA) | 1,4-Cyclohexane-dimethanol Monoacrylate | 23117-36-4 | 18 | 88 | 198 |
| Nippon Kasei | (4HBAGE) | 4-Hydroxybutyl Acrylate Glycidylether | 119692-59-0 | −64 | 7 | 200 |
| Nippon Kasei | (4HBA) | 4-Hydroxybutyl Acrylate | 2478-10-6 | −40 | 10.2 | 144 |
| Osaka Organic Chemicals | IBXA | Iso-Bornyl Acylate | 5888-33-5 | 97 | 7.7 | 208 |
| Osaka Organic Chemicals | Viscoat 3FM | 2,2,2-Trifluoroethyl Methacrylate | 352-87-4 | 81 | 1 | 168 |
| Osaka Organic Chemicals | TBA (C4) | Tert.-butyl Acrylate | 1663-39-4 | 41 | 1.3 | 128 |
| Osaka Organic Chemicals | Viscoat 8FM | 1H,1H,5H-Octafluoropentyl Methacrylate | 355-93-1 | 36 | 4.1 | 300 |
| Osaka Organic Chemicals | STA (C18) | Stearyl Acrylate | 4813-57-4 | 30 | 8.6 (30° C.) | 325 |
| Osaka Organic Chemicals | CHDOL-10 | Cyclohexane-sppiro-2-(1,3-dioxate-4-yl) Methyl Acrylate | 97773-09-6 | 22 | 16.9 | 154 |
| Osaka Organic Chemicals | LA (C12) | Lauryl Acrylate | 2156-97-0 | 15 | 4 | 240 |
| Osaka Organic Chemicals | Viscoat#155 (CHA) | Cyclohexyl Acrylate | 3066-71-5 | 15 | 2.5 | 154 |
| Osaka Organic Chemicals | Viscoat#160 (BZA) | Benzyl Acrylate | 2495-35-4 | 6 | 8 | 162 |
| Osaka Organic Chemicals | OXE-30 | 3-Ethyl-3-oxetanyl Methacrylate | 37674-57-0 | 2 | 4.1 | 192 |
| Osaka Organic Chemicals | OXE-10 | 3-Ethyl-3-oxanylmethyl Acrylate | 41988-14-1 | — | 4.3 | 162 |
| Osaka Organic Chemicals | GBLMA | gamma-Butylolactone Methacrylate | 195000-66-9 | — | Mp = 22 – 24 | 170 |
| Osaka Organic Chemicals | Viscoat 3F | 2,2,2-Trifluoroethyl Acrylate | 407-47-6 | −5 | 1.1 | 154 |
| Osaka Organic Chemicals | Viscoat#150 (THEA) | Tetrahydofurfuryl Acrylate | 2399-48-6 | −12 | 2.8 | 156 |

UV cured Isoprene & PIB Cured-in-Place Gasketing Compositions
25% Compression Sealing Force -continued

| Supplier | Product | Chemical Name | CAS | Tg | Viscosity | MW |
|---|---|---|---|---|---|---|
| Osaka Organic Chemicals | Viscoat 8F | 1H,1H,5H-Octafluoropentyl Acrylate | 376-84-1 | −35 | 3.1 | 286 |
| Osaka Organic Chemicals | Viscoat 4F | 2,2,3,3-Tetrafluropropyl Acrylate | 7283-71-3 | — | 1.9 | 186 |
| Osaka Organic Chemicals | HPA | 2-hydroxypropyl Acrylate | 25584-83-2 999-61-1 | −7 | 4.1 | 130 |
| Osaka Organic Chemicals | MEDOL-10 | (2-Ethyl-2-methyl-1,3-dioxolate-4-yl) Methyl Acrylate | 69701-99-1 | −7 | 5.1 | 208 |
| Osaka Organic Chemicals | HEA | Hydroxyethyl Acrylate | 818-61-1 | −15 | 5.9 | 116 |
| Osaka Organic Chemicals | ISTA (C18) | Iso-Steryl Acrylate | 93841-48-6 | −18 | 17 | 325 |
| Osaka Organic Chemicals | Viscoat#192 (PEA) | Phenoxyethyl Acrylate | 48145-04-6 | −22 | 8.7 | 192 |
| Osaka Organic Chemicals | 4-HBA | 4-hydroxybutyl Acrylate | 10/6/2478 | −32 | 5.5 | 144 |
| Osaka Organic Chemicals | 2-MTA | 2-Methoxyethyl Acrylate | 3121-61-7 | −50 | 1.5 | 130 |
| Osaka Organic Chemicals | IOAA (C$_8$) | Iso-Octyl Acylate | 29590-42-9 | −58 | 2-4 | 184 |
| Osaka Organic Chemicals | INAA (C$_9$) | Iso-Nonyl Acrylate | 51952-49-9 | −58 | — | 198 |
| Osaka Organic Chemicals | NOAA (C$_8$) | N-Ocyl Acrylate | 2499-59-4 | −65 | — | 184 |
| Osaka Organic Chemicals | Viscoat 190 (EOEOEA, CBA) | Ethoxyethoxyethyl Acrylate | 7328-17-8 | −67 | 2.9 | 188 |
| Osaka Organic Chemicals | Viscoat MTG | Methoxytriethylene-glycol Acrylate | 48067-72-7 | — | — | 218 |
| Osaka Organic Chemicals | MPE400A | Methoxypolyethylene-glycol Acrylate | 32171-39-4 | — | 25-30 | 470 |
| Osaka Organic Chemicals | MPE550A | Methoxypoly-ethylene-glycol Acrylate | 32171-39-4 | — | 50-60 | 620 |
| Osaka Organic Chemicals | GBLA | gamma-Butylolactone Acrylate | 328249-37-2 | — | — | 156 |
| Osaka Organic Chemicals | V#2100 | acid functional acrylate | 121915-68-2 | — | 5,000-10,000 | 278 |
| Osaka Organic Chemicals | V#2150 | acid functional acrylate | 61537-62-0 | — | 8,200 | 284 |
| Osaka Organic Chemicals | Viscoat#315 | Structure only (Bis-F, PEG acrylate) | | — | 170 | 226 + 44n |
| Polysciences | 24891-100 | Beta-Carboxyethyl Acrylate, >98% Active | 24615-84-7 | | | 144 |
| Polysciences | 02092-5 | Cinnamyl methacrylate | 31736-34-2 | | | 202 |
| Polysciences | 22493-100 | iso-Decyl methacrylate, min. 90% | 29964-84-9 | | | 226 |
| Polysciences | 24897-250 | Methacrylic Acid, 99.9% | 79-41-4 | | | 86 |
| Polysciences | 24360-10 | o-Nitrobenzyl methacrylate, min. 95% | | | | |
| Polysciences | 06344-10 | Pentabromophenyl acrylate | 52660-82-9 | | solid | 542 |

| | | UV cured Isoprene & PIB Cured-in-Place Gasketing Compositions 25% Compression Sealing Force | | | | |
|---|---|---|---|---|---|---|
| Polysciences | 04253-10 | Pentabromophenyl methacrylate | 18967-31-2 | | solid | 557 |
| Polysciences | 06349-5 | Pentafluorophenyl acrylate | 71195-85-2 | | | 238 |
| Polysciences | 06350-5 | Pentafluorophenyl methacrylate, 95% | 13642-97-2 | | | 252 |
| Polysciences | 16712-100 | Poly(ethylene glycol) (n) monomethacrylate | 25736-86-1 | | | MW of PEG Block = 200 |
| Polysciences | 16713-100 | Poly(ethylene glycol) (n) monomethacrylate | 25736-86-1 | | | MW of PEG Block = 400 |
| Polysciences | 16664-500 | Poly(ethylene glycol) (n) monomethyl ether monomethacrylate | 26915-72-0 | | | MW of PEG Block = 200 |
| Polysciences | 15934-250 | Polypropylene glycol) (300) monomethacrylate | 39240-45-6 | | | MW of PEG Block ~370 |
| Polysciences | 06127-10 | tert-Amyl Methacrylate | 2397-76-4 | | | 156 |
| Polysciences | 03057-10 | Tribromoneopentyl methacrylate | CASRN03057 | | | 393 |
| Polysciences | 18556-500 | Triethylene glycol monoethyl ether monomethacrylate | 39670-09-2 | | | 246 |
| Polysciences | 02544-25 | Undecyl methacrylate | 16493-35-9 | | | 240 |
| San Esters | ADMA | 1-Adamantyl Methacrylate | 16887-36-8 | | | 220 |
| San Esters | MADMA | 2-Methyl-2-Adamantyl Methacrylate | 177080-67-0 | | | 234 |
| San Esters | MADA | 2-Methyl-2-Adamantyl Acrylate | 249562-06-9 | | | 220 |
| San Esters | EtADA | 2-Ethyl-3-Adamantyl Acrylate | 303186-14-3 | | | 234 |
| San Esters | EtADMA | 2-Methyl-2-Adamantyl Acrylate | 209982-56-9 | Solid | | 220 |
| San Esters | ADA | 1-Adamantyl Acrylate | 121601-93-2 | Solid | | 206 |
| Sartomer | SR423A | Isobornyl Methacrylate | 7534-94-3 | 110 | 11 | — |
| Sartomer | SR506A | Isobornyl Acrylate | 5888-33-5 | 95 | 8 | — |
| Sartomer | SR340 | 2-Phenoxyethyl Methacrylate | 10595-06-9 | 54 | 10 | 206 |
| Sartomer | CD535 | Dicyclopentandienyl Methacrylate | 31621-69-9 | 45 | 8 | 218 |
| Sartomer | CD590 | Aromatic Acrylate Monomer | proprietary | 38 | 180 | — |
| Sartomer | SR324 | Stearyl Methacrylate | 32360-05-7 2495-27-4 (33%) | 38 | 14 | 338 |
| Sartomer | SR257 | Stearyl Acrylate | 4813-57-4 | 35 | MP = 24 | 324 |
| Sartomer | CD420 | Acrylic Monomer | Proprietary | 29 | 6 | — |
| Sartomer | SR531 | Cyclic Trimethylpropane Formal Acrylate | 66492-51-1 15625-89-5 (5% tri-acrylate) | 10 | 15 | 200 |
| Sartomer | CD588 | Acrylate Ester | proprietary | 6 | 7 | — |
| Sartomer | SR339 | 2-Phenoxyethyl Acrylate | 48145-04-6 | 5 | 12 | 192 |
| Sartomer | CD9087 | Alkoxylated Phenol Acrylate | proprietary | −24 | 24 | — |
| Sartomer | SR285 | Tetrahydrofurfuryl Acrylate | 2399-48-6 | −28 | 6 | 156 |
| Sartomer | SR335 | Lauryl Acrylate | | −30 | | |
| Sartomer | CD9088 | Alkoxylated Phenol Acrylate | proprietary | −40 | 65 | — |
| Sartomer | SR493D | Tridecyl Methacrylate | 2495-25-2 | −40 | 6 | 268 |

UV cured Isoprene & PIB Cured-in-Place Gasketing Compositions
25% Compression Sealing Force

| Supplier | Product | Chemical Name | CAS | Tg | | |
|---|---|---|---|---|---|---|
| Sartomer | SR242 | Isodecyl Methacrylate | 29964-84-9 | −41 | 5 | 226 |
| Sartomer | CD9075 | Alkoxylated Lauryl Acrylate | proprietary | −45 | 24 | — |
| Sartomer | CD553 | Methoxy Polyethylene Glycol (550) Monoacrylate | 32171-39-4 9004-74-4 | −50 | 50 | 693 |
| Sartomer | SR484 | Octadecyl Acrylate | 2499-99-4 2156-96-9 | −50 | 4 | 203 |
| Sartomer | CD611 | Alkoxylated Tetrahydro-furfuryl Acylate | proprietary | −51 | 11 | — |
| Sartomer | SR495B | Caprolactone Acrylate | 110489-0509 818-61-1 | −53 | 80 | 344 |
| Sartomer | SR256 | 2(2-Ethoxyethoxy)-Ethyl Acrylate | 7328-17-8 | −54 | 6 | 188 |
| Sartomer | SR440 | Iso-Octyl Acrylate | 29590-42-9 | −54 | 5 | 184 |
| Sartomer | SR440A | Iso-Octyl Acrylate (high purity) | 29590-42-9 | −54 | 5 | 184 |
| Sartomer | SR489D | Tridecyl Acrylate | 3076-04-8 | −55 | 7 | 255 |
| Sartomer | CD551 | Methoxy Polyethylene Glycol (350) Monoacrylate | 32171-39-4 9004-74-4 (2% di funct.) | −57 | 22 | 550 |
| Sartomer | SR395 | Isodecyl acrylate | 1330 | −60 | 5 | 212 |
| Sartomer | SR550 | Methoxy Polyethylene Glycol (350) Monomethacrylate | 26915-72-0 9004-74-4 (2%) | −62 | 100 | 450 |
| Sartomer | CD552 | Methoxy Polyethylene Glycol (550) Monomethacrylate | 26915-72-0 9004-74-4(2% di funct.) | −65 | 39 | 693 |
| Sartomer | SR313A | Lauryl Methacrylate | 142-90-5 | −65 | 6 | 254 |
| Sartomer | SR313B | C12 C14 Alkyl Methacrylate | 142-90-5 2549-53-3 2495-27-4 | −65 | 6 | 254 |
| Sartomer | SR313D | C12 C14 Alkyl Methacrylate | 142-90-5 2549-53-3 2495-27-4 | −65 | 6 | 254 |
| Sartomer | CD278 | Acrylate Ester | proprietary | −74 | 5 | — |
| Sartomer | CD545 | Diethylene Glycol Methyl Ether Methacrylate | 45103-58-0 111-77-3(1% di funct.) | — | 3 | — |
| Sartomer | CD585 | Acrylic Ester | proprietary | — | 8 | — |
| Sartomer | CD586 | Acrylic Ester | proprietary | — | 6-9(38° C.) | — |
| Sartomer | CD587 | Acrylic Ester | proprietary | — | solid (MP = 55° C.) | — |
| Sartomer | CD591 | Acrylic Ester | proprietary | — | 20 | — |
| Sartomer | CD613 | Ethoxylated Nonyl Phenol Acrylate | 678991-31-6 68412-54-4 (5-10%) | — | 75 | — |
| Sartomer | CD730 | Triethylene Glycol Ethyl Ether Methacrylate | proprietary | — | 6 | — |

What is claimed:

1. A method of increasing the low temperature sealing force of a cured elastomeric sealant comprising:

providing a cross linkable sealant composition, prepared from a cross linkable telechelic polyisobutylene oligomer having a Tg, an initiator or cross-linking agent, and optionally at least one of catalyst, filler, antioxidant, reaction modifier, and coloring agent;

adding about 10 to about 30% by weight of sealant composition of a singly functional (meth)acrylate glassy monomer having a Tg higher than the polyisobutylene oligomer Tg or a combination of singly functional (meth)acrylate glassy monomers having an average Tg for the combination higher than the polyisobutylene oligomer Tg; and adding about 1 to about 30% by weight of sealant composition of a singly functional (meth)acrylate rubbery monomer having a Tg below the glassy monomer Tg or a combination of singly functional (meth)acrylate rubbery monomers having an average Tg below the glassy monomer Tg to form an improved sealant composition;

wherein the weight ratio of glassy monomer to rubbery monomer in the sealant composition is 1:1 to 8:1 and cured reaction products of the improved sealant composition retain a higher sealing force at temperatures between their Tg and 0° C. than cured reaction products made from the same cross linkable sealant composition without the glassy monomer.

2. The method of claim 1 wherein the telechelic polyisobutylene oligomer has a polyisobutylene backbone terminating with one or more reactive moieties.

3. The method of claim 1 wherein the telechelic polyisobutylene oligomer is a telechelic, (meth)acrylate terminated polyisobutylene.

4. The method of claim 1 wherein the singly functional (meth)acrylate glass monomers and the singly functional (methacrylate) rubber monomers react with the telechelic polyisobutylene oligomer.

5. The method of claim 1 wherein the telechelic polyisobutylene oligomer has a backbone comprising about 1% to about 100% polyisobutylene.

6. The method of claim1 wherein the singly functional (meth)acrylate rubbery monomer has a Tg below 20° C.

7. The method of claim 1 wherein the initiator or cross-linking agent is a heat cure initiator.

8. The method of claim 1 wherein the weight ratio of glassy monomer to rubbery monomer in the sealant composition is 1:1 to 3:1.

9. An improved sealant composition, prepared by the method of claim 1.

10. A component defining an internal chamber, comprising:
a first predetermined sealing surface in fluid communication with the chamber;
a second predetermined sealing surface aligned with the first sealing surface and in fluid communication with the chamber; and
a cured reaction product of an improved sealant composition prepared by the method of claim 1 disposed between the first and second predetermined sealing surfaces and sealing the chamber.

11. The component of claim 10 wherein the first sealing surface and the second sealing surface do not move in relationship to each other.

12. The component of claim 10 wherein the reaction product is adhesively bonded to only one of the first and second sealing surfaces.

13. The component of claim 10 wherein the reaction product is adhesively bonded to both the first and second sealing surfaces.

14. A method of using a curable composition as a liquid gasketing composition, comprising:
providing an improved sealant composition prepared by the method of claim 1;
dispensing the composition onto a first predetermined sealing surface,
aligning the first predetermined sealing surface and dispensed composition with a second predetermined sealing surface; and
exposing the dispensed the composition to conditions appropriate to effect cure thereof, wherein cured reaction products of the composition have a single Tg and retain a positive sealing force at temperatures above the cured product Tg.

15. The method of claim 14 wherein the composition is cured while in contact with the first and second sealing surfaces.

* * * * *

UNITED STATES PATENT AND TRADEMARK OFFICE
CERTIFICATE OF CORRECTION

PATENT NO. : 10,005,919 B2  
APPLICATION NO. : 14/682251  
DATED : June 26, 2018  
INVENTOR(S) : Matthew P. Burdzy et al.

Page 1 of 1

It is certified that error appears in the above-identified patent and that said Letters Patent is hereby corrected as shown below:

In the Specification

Column 4, Line 42, change "silylated of amide" to -- silylated polyamide --

Column 12, Line 6, change "Qasketing" to -- Gasketing --

Signed and Sealed this  
Twenty-sixth Day of February, 2019

Andrei Iancu  
*Director of the United States Patent and Trademark Office*